(12) United States Patent  
Ono et al.

(10) Patent No.: US 6,594,768 B1  
(45) Date of Patent: Jul. 15, 2003

(54) COLLECTIVE LINE TERMINATION APPARATUS AND LINE TERMINATION NETWORK

(75) Inventors: Yasuhiro Ono, Kawasaki (JP); Kiyoshi Sukegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 09/587,350

(22) Filed: Jun. 5, 2000

(30) Foreign Application Priority Data

Aug. 4, 1999 (JP) .......................................... 11-220939

(51) Int. Cl.$^7$ ................................................ G06F 1/30
(52) U.S. Cl. ........................ 713/300; 713/340; 710/301
(58) Field of Search ................................ 713/300, 324, 713/330, 340; 710/301, 302

(56) References Cited

U.S. PATENT DOCUMENTS

| | | | | |
|---|---|---|---|---|
| 5,537,584 A | * | 7/1996 | Miyai et al. | 714/42 |
| 5,758,171 A | * | 5/1998 | Ramamurthy et al. | 713/300 |
| 6,199,180 B1 | * | 3/2001 | Ote et al. | 714/31 |
| 6,345,309 B2 | * | 2/2002 | Ohsawa et al. | 709/250 |
| 6,378,027 B1 | * | 4/2002 | Bealkowski et al. | 710/302 |

FOREIGN PATENT DOCUMENTS

| JP | 3-165639 | 7/1991 |
|---|---|---|
| JP | 6-98036 | 4/1994 |
| JP | 9-83604 | 3/1997 |

* cited by examiner

Primary Examiner—Dennis M. Butler  
(74) Attorney, Agent, or Firm—Katten Muchin Zavis Rosenman

(57) ABSTRACT

A collective line-termination apparatus including a power-supply-interruption-notification requesting unit in each of the interface boards for outputting a request signal requesting a power-supply interruption; a first switch in each of the interface boards for supplying or cutting off power generated by the power-supply board; a power-supply-interruption-notification-information insertion unit in each of the interface boards for inserting power-supply-interruption-notification information into a first predetermined bit position in a first frame to be transmitted to the higher level interface board. The collective line-termination apparatus includes a power-supply-interruption-confirmation-information reception unit in each of the interface boards for receiving power-supply-interruption-confirmation information inserted into a second predetermined bit position in a second frame to be transmitted by the higher level interface board; and an alarm generation unit in each of the interface boards for generating an alarm indicating the power-supply-interruption-confirmation-information reception unit not receiving the power-supply-interruption-confirmation information after a predetermined time since an issuance of the request signal requesting notification of a power-supply interruption by the power-supply-interruption-notification requesting unit.

11 Claims, 18 Drawing Sheets

COLLECTIVE LINE TERMINATION APPARATUS AND LINE TERMINATION NETWORK

BACKGROUND OF THE INVENTION

1. Field of the Invention

In general, the present invention relates to a collective line-termination apparatus and a line-termination network. More particularly, the present invention relates to reduction of an apparatus cost, reduction of power consumption and improvement of reliability of a collective line-termination apparatus and a line-termination network.

2. Description of the Related Art

With the rapid popularization of the Internet, the use of a line-termination apparatus (DSU) connected between a terminal such as a personal computer installed in an enterprise or at home and a high-speed ISDN transmission line has become the general way of establishing communication through the Internet. By the way, in a construction such as a building and an apartment, a plurality of workers and residents use a plurality of terminals. Thus, if a DSU is installed for each terminal, the cost of the DSU installation will increase. In order to solve this problem, a collective line-termination apparatus is employed. The collective line-termination apparatus accommodates a plurality of interface boards and a power-supply board. The interface boards each serve as an interface between a terminal and a higher-level apparatus. On the other hand, the power-supply board supplies power to the interface boards. Each of the interface boards can be plugged in or pulled out from the collective line-termination apparatus so that, when an interface board is not used, it can be removed.

When the collective line-termination apparatus itself is no longer used, the apparatus is just removed. If a specific interface board is no longer used, only the specific board is removed from the collective line-termination apparatus. If such an interface board is removed or pulled out before a power-supply interruption is reported to an interface board at a higher level, a frame signal representing an abnormal frame and having a deteriorated optical signal level is transmitted to the higher-level interface board. Such a frame signal is detected by the interface board at the higher level as a warning against a state of out-off-synchronization or a deterioration of the signal level. Such an alarm is thus an error caused by the removal or the pulling out of the specific interface board. In order to allow the interface board at the higher level to recognize an error correctly, it is necessary to inform the higher-level interface board of a cause of an error. In this particular case, a power-supply interruption is reported to an interface board at a higher level before the interface board is removed or pulled out to solve the problem. Conventionally, when a collective line-termination apparatus itself is no longer used, a power-supply switch provided on the apparatus is turned off. When the power-supply switch is turned off, a notice of a power-supply interruption is output to an interface board at a higher level by using a backup power supply provided on each of interface boards employed in the collective line-termination apparatus. When a specific interface board is no longer used, a power-supply-interruption alarm switch provided on the interface board or on the case of the collective line-termination apparatus for each interface board is turned on. When the power-supply-interruption alarm switch is turned on, the specific interface board outputs a notice of a pseudo power-supply interruption to the interface board at the higher level. The power-supply interruption is called a pseudo power-supply interruption because the supply of power to the specific interface board is not really interrupted as long as the board remains mounted on the collective line-termination apparatus. Thus, power is supplied by the power-supply board to the specific interface board, keeping the board in an operating state till the board is removed from the apparatus.

The conventional collective line-termination apparatus has the following problems.

1. With an interface board mounted on the collective line-termination apparatus, the power supply of the board is not turned off, keeping the board in an operating state to transmit frames to an interface board at a higher level even if the board is no longer used. Thus, there is raised a problem of wasteful consumption of power.

2. A backup circuit is required for each interface board, increasing the cost.

3. The actual implementation of the collective line-termination apparatus does not leave any space for installing a power-supply-interruption alarm switch for each interface board in the interface boards or on the cabinet of the apparatus. Without such a power-supply-interruption alarm switch, it is impossible to notify an interface at a higher level of a notice of a power-supply interruption from an external source in case a specific interface board employed in the collective line-termination apparatus is no longer used.

4. Recognition of whether or not a notice of a power-supply interruption has been transmitted normally by the collective line-termination apparatus to a higher-level apparatus is not established clearly.

5. In the event of a power-supply interruption of the collective line-termination apparatus, the power-supply board or a backup circuit provided on an interface board drives all circuits mounted on the interface board. Since a backup circuit with a large capacity is required, the size of the backup circuit is also large, becoming a big load mounted on the collective line-termination apparatus.

6. In a terminal, a line-termination apparatus and/or a higher-level apparatus, frames are exchanged between the line-termination apparatus and an interface board at the higher level even if, for example, the power-supply switch of the terminal is turned off. That is to say, there is no interlock mechanism that works in the event of a power-supply interruption, leading to a state in which individual units are operating independently of each other in an uncoordinated manner. As a result, power is consumed wastefully in the system as a whole.

SUMMARY OF THE INVENTION

It is thus an object of the present invention to provide a line-termination network and a collective line-termination apparatus allowing power consumption to be reduced.

It is another object of the present invention to provide a collective line-termination apparatus that allows the cost to be reduced.

It is a further object of the present invention to provide a line-termination network and a collective line-termination apparatus which establish clear recognition of a power-interruption notice.

In accordance with an aspect of the present invention, there is provided a collective line-termination apparatus having a power-supply board and a plurality of interface units each serving as an interface between a terminal connected to the interface unit and a higher-level apparatus, the collective line-termination apparatus comprising a power-supply-interruption-notification requesting means provided in each of the interface units and used for outputting a request signal making a request for notification of a power-supply interruption; a first switch provided in each of the interface units and used for passing on or cutting off power generated by the power-supply board; a power-supply-interruption-notification-information insertion means provided in each of the interface units and used for inserting power-supply-interruption-notification information into a first predetermined bit position in a first frame to be transmitted to the higher-level apparatus; a power-supply-interruption-confirmation-information reception means provided in each of the interface units and used for receiving power-supply-interruption-confirmation information inserted into a second predetermined bit position in a second frame to be transmitted by the higher-level apparatus; and an alarm generation means provided in each of the interface units and used for generating an alarm signaling the fact that the associated power-supply-interruption-confirmation-information reception means does not receive the power-supply-interruption-confirmation information even after a period of time with a predetermined length lapses since an issuance of the request signal by the associated power-supply-interruption-notification requesting means to make a request for notification of a power-supply interruption, wherein the first switch is turned off to cut off power generated by the power-supply board when the power-supply-interruption-confirmation-information reception means receives the power-supply-interruption-confirmation information.

In accordance with another aspect of the present invention, there is provided a collective line-termination apparatus having a power-supply board and a plurality of interface units each serving as an interface between a terminal connected to the interface unit and a higher-level apparatus, the collective line-termination apparatus comprising an insertion/removal notification unit provided in each of the interface units, connected to one of the terminals connected to the interface unit and used for outputting information on insertion/removal indicating an insertion or a removal; a first switch provided in each of the interface units and used for passing on or cutting off power generated by the power-supply board; a power-supply-interruption notification means provided in each of the interface units and used for transmitting a first frame including inserted power-supply-interruption information to the higher-level apparatus; and an insertion/removal confirmation means provided in each of the interface units and used for requesting the power-supply-interruption notification means to transmit the first frame to the higher-level apparatus when the insertion/removal notification unit outputs information on insertion/removal indicating a removal, wherein the first switch is controlled to turn on and off in accordance with the information on insertion/removal.

The above and other objects, features and advantages as well as the manner of realizing them will become more apparent and, in addition, the present invention itself will be best understood from a careful study of the following detailed description of some preferred embodiments of the invention and appended claims defining the scope of the invention with reference to accompanying diagrams showing the embodiments.

DETAILED DESCRIPTION OF THE PREFERRED EMBODIMENTS

Figure 1:
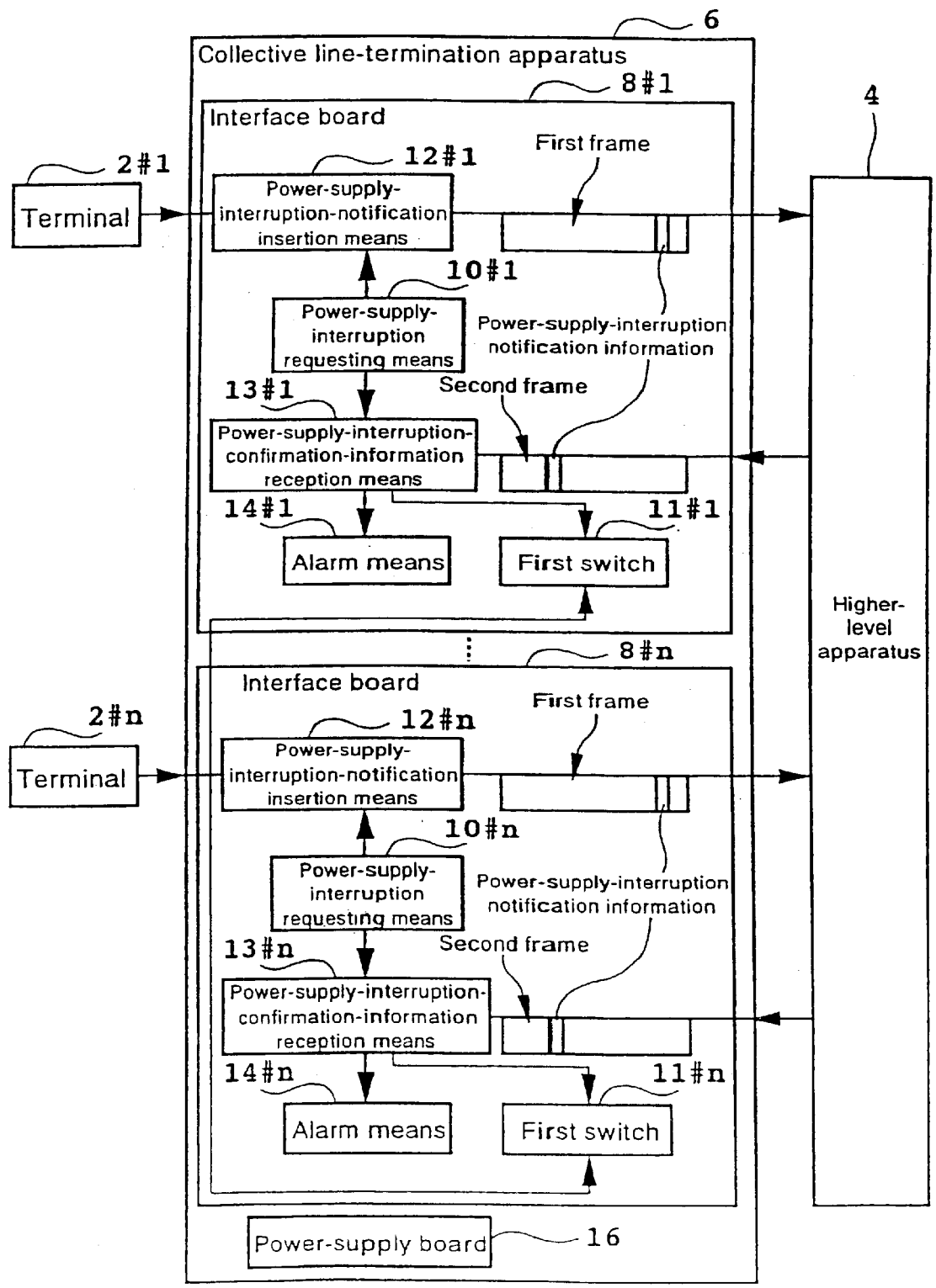
FIG. 1 is a block diagram showing the principle of the present invention.

First of all, the principle of the present invention is explained before describing the embodiments of the present invention. FIG. 1 is a block diagram showing the principle of the present invention. As shown in the figure, connected between terminals 2#i where i=1 to n and a higher-level apparatus 4, a collective line-termination apparatus 6 comprises a plurality of interface boards 8#i where i=1 to n and a power-supply board 16 for supplying power to each of the interface boards 8#i where i=1. The interface boards 8#i where i=1 each have a function to inform the higher-level apparatus 4 of a power-supply interruption in the event of such a power-supply interruption occurring in the collective line-termination apparatus 6. An interface board 8#i notifies the higher-level apparatus 4 of a power-supply interruption by transmitting a first frame including information informing a power-supply interruption at a first predetermined bit position to the higher-level apparatus 4. Each of the interface boards 8#i has a power-supply-interruption-notification-information insertion means 12#i for inserting power-supply-interruption-notification information into a first predetermined bit position of a first frame transmitted to the higher-level apparatus 4. In addition, each of the interface boards 8#i also includes a power-supply-interruption-notification requesting means 10#i for outputting a request signal making a request for notification of a power-supply interruption, and a first switch 11#i for passing on or cutting off power generated by the power-supply board 16. Moreover, the interface boards 8#i each further have a power-supply-interruption-confirmation-information reception means 13#i for receiving power-supply-interruption-confirmation information inserted into a second predetermined bit position of a second frame transmitted by the higher-level apparatus 4, and an alarm generation means 14#i for generating an alarm signaling the fact that the associated power-supply-interruption-confirmation-information reception means 13#i did not receive the power-supply-interruption-confirmation information from the higher-level apparatus 4 even after a period of time of a predetermined length has lapsed since an issuance of the request signal by the associated power-supply-interruption-notification requesting means 10#i to make a request for notification of a power-supply interruption. When the power-supply-interruption-confirmation-information reception means 13#i receives power-supply-interruption-confirmation information from the higher-level apparatus 4, the associated first switch 11#i is turned off to cut off power supplied by the power-supply board 16.

The operation of the present invention shown in FIG. 1 is explained as follows.

When an interface board 8#i is no longer used, typically, the person in charge of maintenance operates the power-supply-interruption-notification requesting means 10#i such as a switch or an insertion/removal-information output unit to request the power-supply-interruption-notification information insertion means 12#i to issue a notice of a power-supply interruption of power supplied to the specific interface board 8#i. When the power-supply-interruption-notification requesting means 10#i issues a request for notification of a power-supply interruption to the power-supply-interruption-information insertion means 12#i, the power-supply-interruption-information insertion means 12#i inserts power-supply-interruption-notification information into a first predetermined bit position of a first frame which is then transmitted to the higher-level apparatus 4. Thus, the first frame which is then transmitted to the higher-level apparatus 4 includes power-supply-interruption-notification information at a first predetermined bit position thereof. Detecting the power-supply-interruption-notification information included in the first frame, the higher-level apparatus 4 inserts power-supply-interruption-confirmation information into a second predetermined bit position of a second frame and sending the second frame to the board 8#i. Detecting the power-supply-interruption-confirmation information included in the second frame, the power-supply-interruption-confirmation-information reception means 13#i turns off the first switch 11#i. On the other hand, the alarm generation means 14#i is warned of the fact that the associated power-supply-interruption-confirmation-information reception means 13#i did not receive the power-supply-interruption-confirmation information from the higher-level apparatus 4 even after a period of time of a predetermined length has lapsed since the issuance of the request signal by the power-supply-interruption-notification requesting means 10#i to make a request for notification of a power-supply interruption. The warning given to the means 14#i indicates that it is quite within the bounds of possibility that the notice of the power-supply interruption is not received by the higher-level apparatus 4 or a failure has occurred on the transmission line or the apparatus. In this case, the person in charge of maintenance is capable of disposing the problem by typically searching the system for a cause of the failure.

First Embodiment

Figure 2:
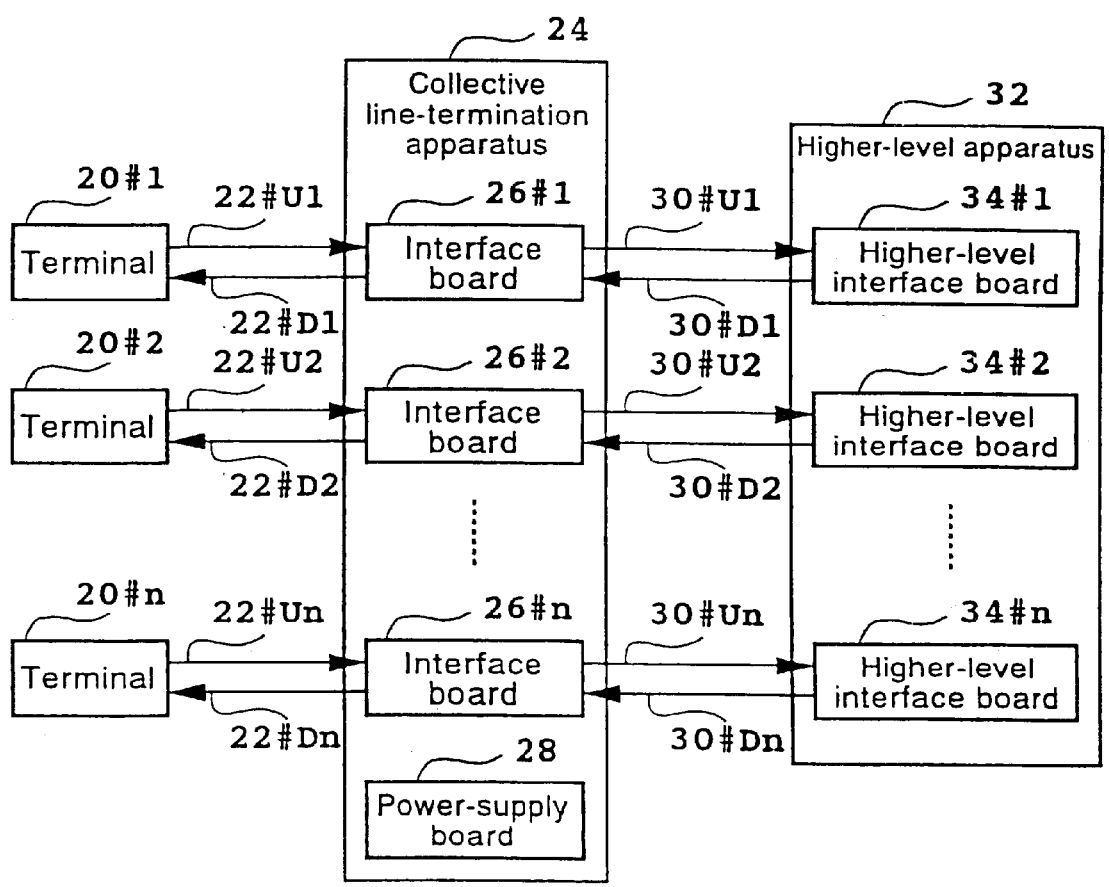
FIG. 2 is a block diagram showing the configuration of a line-termination network implemented by a first embodiment of the present invention.

FIG. 2 is a block diagram showing the configuration of a line-termination network implemented by a first embodiment of the present invention. As shown in the figure, the line-termination network comprises a plurality of terminals 20#i where i=1 to n, a collective line-termination apparatus 24 and a higher-level apparatus 32. The collective line-termination apparatus 24 includes a plurality of interface boards 26#i where i=1 to n and a power-supply board 28. On the other hand, the higher level apparatus 32 has a plurality of higher-level interface boards 34#i where i=1 to n. Each of the terminals 20#i is either a personal computer or a telephone terminal. Each of the interface boards 26#i employed in the collective line-termination apparatus 24 terminates an interface between a terminal 20#i and a higher-level interface board 34#i in the higher level apparatus 32. An interface board 26#i is connected to a terminal 20#i by transmission lines 22#Ui and 22#Di which implement typically an electrical interface such as a primary group speed user network interface. On the other hand, an interface board 26#i is connected to a higher-level interface board 34#i by transmission lines 30#Ui and 30#Di which implement typically an optical interface of an 1.5-M optical subscriber transmission frame or the like. The power-supply board 28 supplies main power to the interface boards 26#i, reports a power-supply interruption and cuts off power. A higher-level interface board 34#i terminates an interface between an interface board 26#i and the higher-level apparatus 32.

Figure 3:
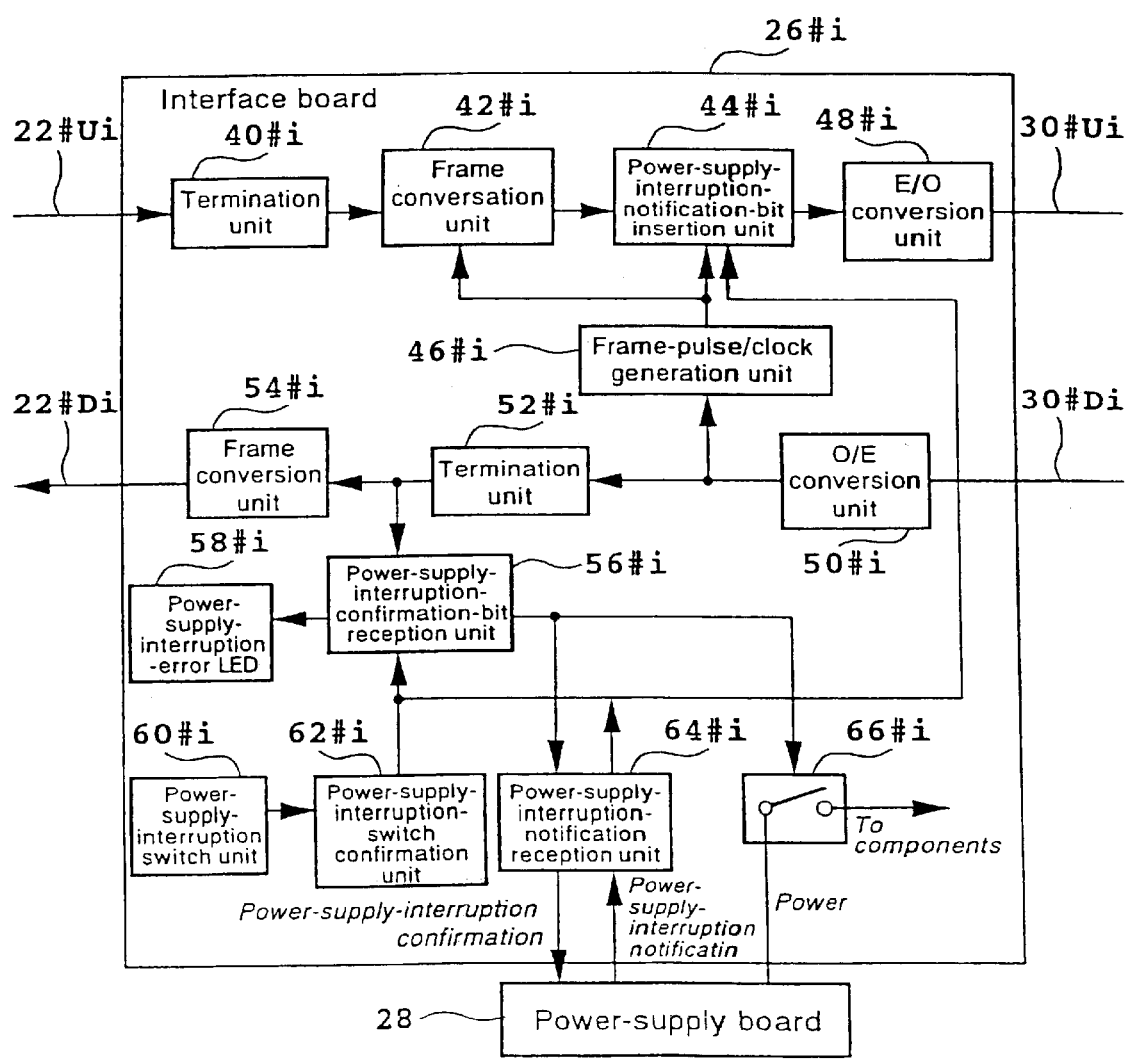
FIG. 3 is a functional block diagram showing the configuration of an interface board employed in the line-termination network shown in FIG. 2.

FIG. 3 is a functional block diagram showing the configuration of an interface board 26#i employed in the line-termination network shown in FIG. 2. As shown in FIG. 3, the interface board 26#i comprises a termination unit 40#i, a frame conversion unit 42#i, a power-supply-interruption-notification-bit insertion unit 44#i, a frame-pulse/clock generation unit 46#i, an E/O conversion unit 48#i, an O/E conversion unit 50#i, a termination unit 52#i, a frame conversion unit 54#i, a power-supply-interruption-confirmation-bit reception unit 56#i, a power-supply-interruption-error LED 58#i, a power-supply-interruption switch unit 60#i, a power-supply-interruption switch confirmation unit 62#i, a power-supply-interruption-notification reception unit 64#i and a switch unit 66#i. The termination unit 40#i terminates an electrical interface between the interface board 26#i and the terminal 20#i. The frame conversion unit 42#i converts a frame received from the transmission line 22#Ui into a frame prescribed as a frame to be exchanged between the interface board 26#i and the higher-level interface board 34#i in synchronization with a clock signal and a frame pulse output by the frame-pulse/clock generation unit 46#i. The power-supply-interruption-bit insertion unit 44#i inserts power-supply-interruption notification 1-bit information into a predetermined bit position of a going-up frame output by the frame conversion unit 42#i in synchronization with a clock signal and a frame pulse output by the frame-pulse/clock generation unit 46#i and in accordance with a request made by the power-supply-interruption-switch confirmation unit 62#i or the power-supply-interruption-notification reception unit 64#i, passing through other bits of the frame. The frame-pulse/clock generation unit 46#i extracts a clock signal from a frame output by the O/E conversion unit 50#i, outputting a frame pulse indicating the beginning of the frame along with the extracted clock signal. The E/O conversion unit 48#i converts the signal format of a frame output by the power-supply-interruption-bit insertion unit 44#i from an electrical signal into an optical signal output to the line 30#Ui.

The O/E conversion unit 50#i converts a frame with the format of an optical signal received from the line 30#Di into a frame with the format of an electrical signal. The termination unit 52#i terminates an interface for a frame having the format of an electrical signal. The frame conversion unit 54#i converts a frame terminated by the termination unit 52#i into a frame that can be exchanged between the interface board 26#i and the terminal 20#i. The power-supply-interruption-confirmation-bit reception unit 56#i extracts power-supply-interruption-confirmation 1-bit information from a predetermined bit position of a frame output by the termination unit 52#i. When such power-supply-interruption-confirmation 1-bit information is not received even after a time of a predetermined length has lapsed since reception of a power-supply-interruption notice from the power-supply-interruption-switch confirmation unit 62#i or the power-supply-interruption-notification reception unit 64#i, the power-supply-interruption-confirmation-bit reception unit 56#i puts the power-supply-interruption-error LED 58#i in a state as described above. If such power-supply-interruption-confirmation 1-bit information is received, on the other hand, the switch unit 66#i is turned off. The power-supply-interruption-error LED 58#i is a component for indicating whether or not such power-supply-interruption-confirmation 1-bit information has been received from the higher-level interface board 34#i. Typically, the power-supply-interruption-error LED 58#i comprises a blue-color LED and a red-color LED. At a normal time, for example, the blue-color LED is turned on while the red-color LED is turned off. When power-supply-interruption-confirmation 1-bit information is not received in response to power-supply-interruption notification 1-bit information, on the other hand, the blue-color LED is turned off while the red-color LED is turned on instead.

Seeing the power-supply-interruption-error LED 58#i, the person in charge of maintenance or the like is capable of verifying that the higher-level interface board 34#i has normally received the notice of a power-supply interruption. Thus, even if the interface board 26#i is removed, no problem will be raised since the higher-level interface board 34#i masks an alarm of disappearance of an optical input or an out-off-synchronization state caused by the removal of the interface board 26#i. The power-supply-interruption switch unit 60#i is a switch for informing the higher-level interface board 34#i of a power-supply interruption of the interface board 26#i. It should be noted that, while the power-supply-interruption switch unit 60#i is employed in this embodiment, another component can be used as long as the other component is capable of reporting a power-supply interruption of the interface board 26#i. An example of such a component is an insertion/removal-information generator that is capable of outputting information indicating that the interface board 26#i is mounted or pulled out at the time the interface board 26#i is inserted or removed. When the power-supply-interruption switch unit 60#i is turned off, the power-supply-interruption-switch confirmation unit 62#i notifies the power-supply-interruption-confirmation-bit reception unit 56#i and the power-supply-interruption-bit insertion unit 44#i of a power-supply interruption. Receiving a notice of a power-supply interruption from the power-supply board 28, the power-supply-interruption-notification reception unit 64#i notifies the power-supply-interruption-confirmation-bit reception unit 56#i and the power-supply-interruption-bit insertion unit 44#i of a power-supply interruption. Receiving a notice of a power-supply interruption from the power-supply-interruption-confirmation-bit reception unit 56#i, the power-supply-interruption-notification reception unit 64#i notifies the power-supply board 28 of a power-supply interruption. The switch unit 66#i is a switch for passing on or cutting off power to or from parts of the interface board 26#i. The switch unit 66#i is turned off in accordance with control executed by the power-supply-interruption-confirmation-bit reception unit 56#i.

Figure 4:
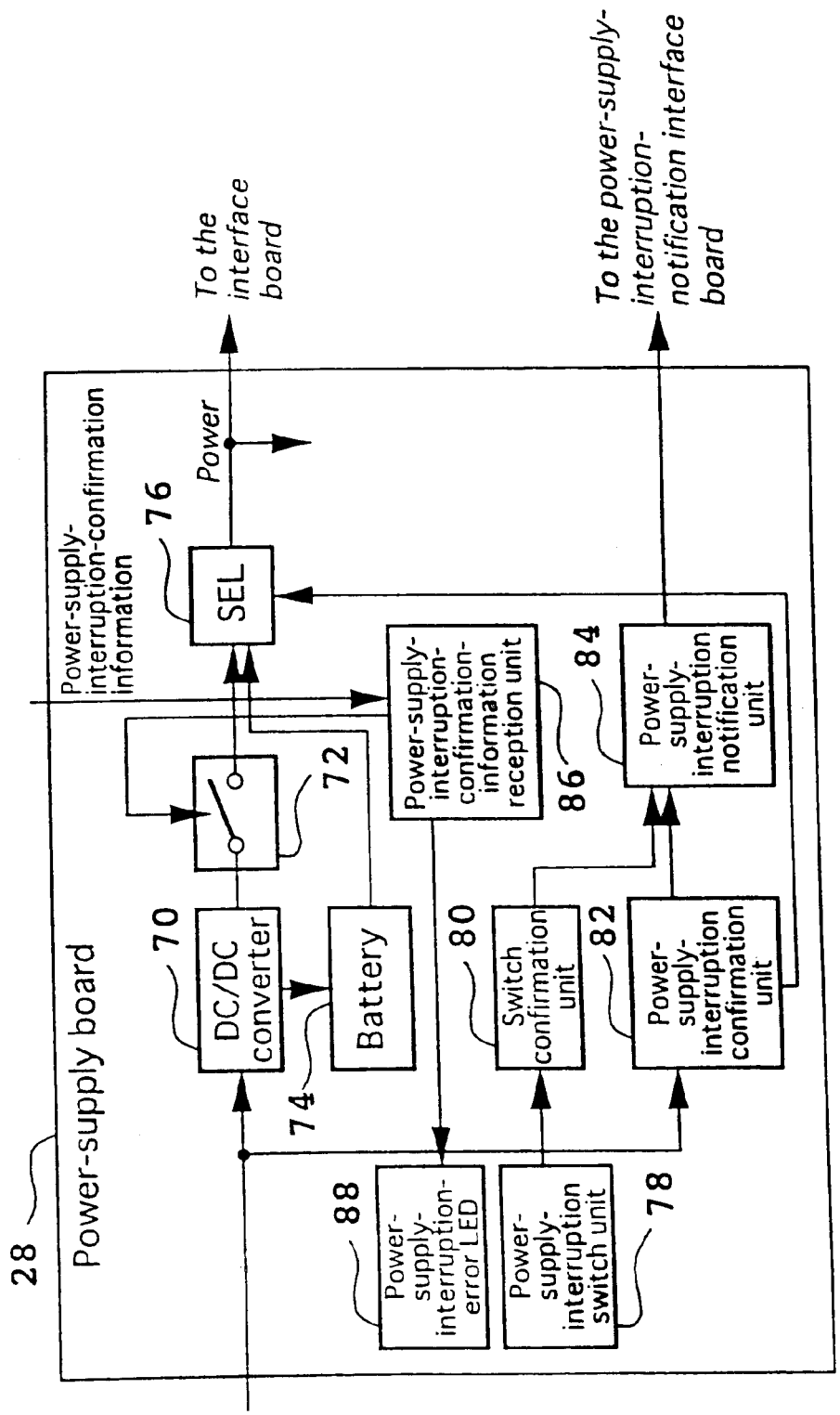
FIG. 4 is a functional block diagram showing the configuration of a power-supply board employed in the line-termination network shown in FIG. 2.

FIG. 4 is a functional block diagram showing the configuration of the power-supply board 28 employed in the line-termination network shown in FIG. 2. As shown in FIG. 4, the power-supply board 28 comprises a DC/DC converter 70, a switch unit 72, a battery 74, a selector 76, a power-supply-interruption switch unit 78, a switch confirmation unit 80, a power-supply-interruption-confirmation unit 82, a power-supply-interruption notification unit 84, a power-supply-interruption-confirmation-information reception unit 86 and a power-supply-interruption error LED 88. The DC/DC converter 70 is the main power-supply unit. Typically, the DC/DC converter 70 converts an external power of −48V supplied by an external power supply into an operating voltage of +5V of the interface board 26#i. The switch unit 72 is a switch for passing on or cutting off power generated by the main power supply unit 70 to or from the interface board 26#i. The battery 74 serves as a backup power supply for the DC/DC converter 70. To be more specific, when the generation of power of −48V by the external power supply is interrupted, the battery 74 supplies power to each of the interface boards 26#i only while the interface board 26#i is transmitting a notice of a power-supply interruption to the higher-level interface board 34#i. The selector 76 selects the power generated by the battery 74 when the power-supply-interruption confirmation unit 82 confirms the fact that the generation of the −48V-power by the external power supply is interrupted. Otherwise, the selector 76 selects the power passed on by the switch unit 72. The power-supply-interruption switch unit 78 is turned off typically by the person in charge of maintenance when the collective line-termination apparatus 24 is no longer used. When the power-supply-interruption switch unit 78 is turned off, the switch confirmation unit 80 informs the power-supply-interruption notification unit 84 of a power-supply interruption. When the generation of power of −48V by the external power supply is interrupted, the power-supply-interruption confirmation unit 82 notifies the power-supply-interruption notification unit 84 and the selector 76 of a power-supply interruption.

Receiving a notice of a power-supply interruption, the power-supply-interruption notification unit 84 informs the power-supply-interruption-confirmation-information reception unit 86 and all the interface boards 26#i where i=1 to n mounted on the collective line-termination apparatus 24 of a power-supply interruption. Receiving a confirmation of a power-supply interruption from each of all the interface boards 26#i where i=1 to n, the power-supply-interruption-confirmation-information reception unit 86 displays the power-supply interruption on the power-supply-interruption-error LED 88. Also displayed on the power-supply-interruption-error LED 88 by the power-supply-interruption-confirmation-information reception unit 86 is the fact that no notices of a power-supply interruption were received from all the interface boards 26#i where i=1 to n even after a time with a predetermined length has lapsed since reception of a notice of a power-supply interruption from the power-supply-interruption notification unit 84. In addition, the power-supply-interruption-confirmation-information reception unit 86 turns off the switch unit 72 when notices of a power-supply interruption are received from all the interface boards 26#i where i=1 to n. Otherwise, the power-supply-interruption-confirmation-information reception unit 86 turns on the switch unit 72. The power-supply-interruption-error LED 88 is an alarm means for displaying an error caused by the fact that no notices of a power-supply interruption were received from all the interface boards 26#i where i=1 to n even after a time with a predetermined length has lapsed since notification of a power-supply interruption.

Figure 5:
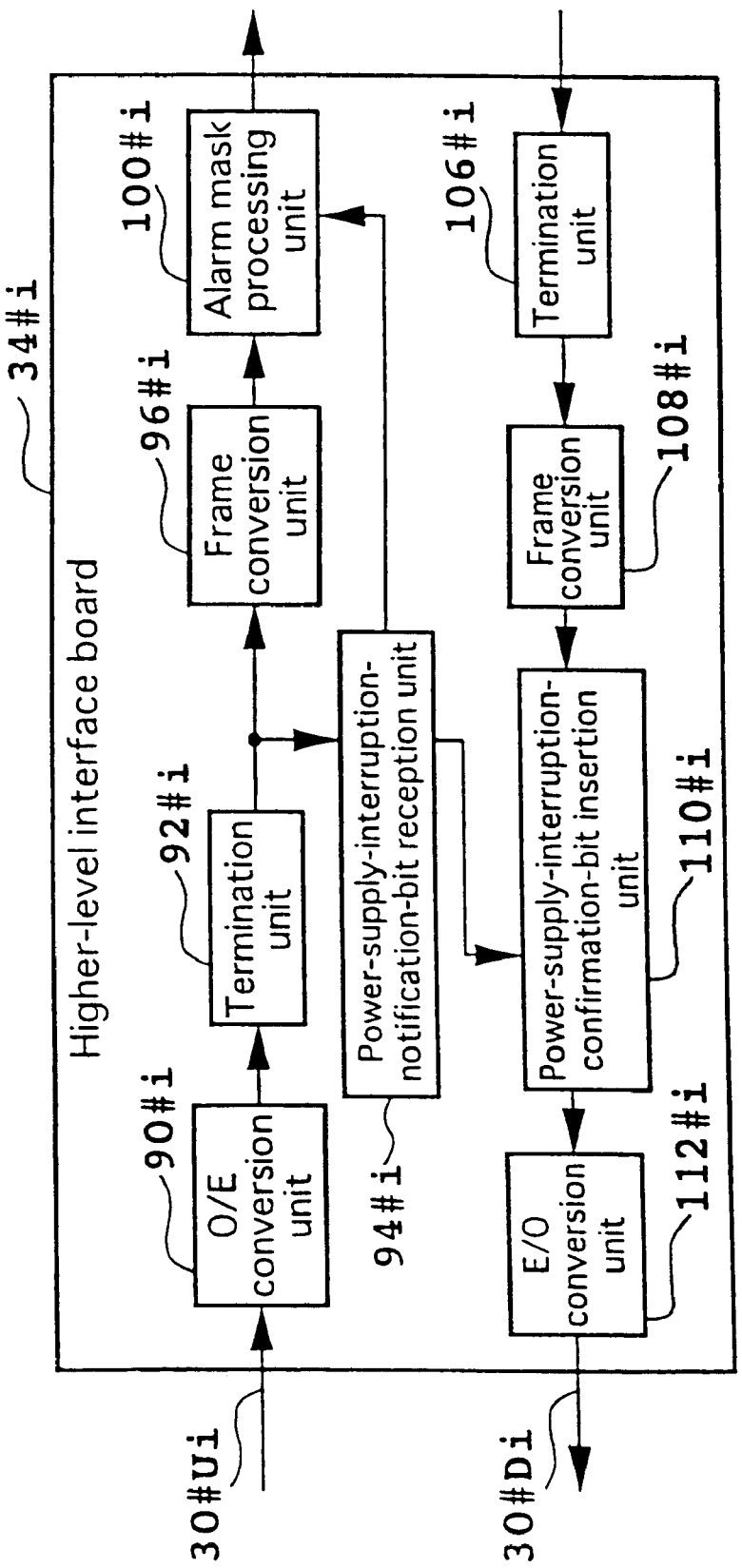
FIG. 5 is a functional block diagram showing the configuration of a higher-level interface board employed in the line-termination network shown in FIG. 2.

FIG. 5 is a functional block diagram showing the configuration of the higher-level interface board 34#i employed in the line-termination network shown in FIG. 2. As shown in FIG. 5, the higher-level interface board 34#i comprises an O/E conversion unit 90#i, a termination unit 92#i, a power-supply-interruption-notice-bit reception unit 94#i, a frame conversion unit 96#i, an alarm mask processing unit 100#i, a termination unit 106#i, a frame conversion unit 108#i, a power-supply-interruption-confirmation-bit insertion 110#i and an E/O conversion unit 112#i. The O/E conversion unit 90#i converts an optical signal received from the line 30#Ui into an electrical signal. The termination unit 92#i terminates an interface between the higher-level interface board 34#i and the interface board 26#i. The power-supply-interruption-notification-bit reception unit 94#i extracts power-supply-interruption notification 1-bit information from a predetermined bit position in a frame converted into the format of an electrical signal. The frame conversion unit 96#i converts a frame received from the line 30#Ui into a frame prescribed as a frame to be transmitted by the higher level apparatus 32 to a further-higher-level apparatus 38. Receiving a notice of a power-supply interruption from the power-supply-interruption-notification-bit reception unit 94#i, the alarm mask processing unit 100#i masks an alarm bit indicating an alarm of an out-off-synchronization state or an alarm of discontinuance of an optical input due to a power-supply interruption. The termination unit 106#i terminates an interface between the higher-level apparatus 32 and the further-higher-level apparatus 38. The frame conversion unit 108#i converts a going-up frame into a frame prescribed as a frame to be transmitted by the interface board 26#i to the higher-level interface board 34#i. Receiving a notice of a power-supply interruption from the power-supply-interruption-notification-bit reception unit 94#i, the power-supply-interruption-confirmation-bit insertion unit 110#i inserts power-supply-interruption-confirmation 1-bit information into a predetermined bit position in a going-up frame transmitted by the interface board 26#i to the higher-level interface board 34#i to indicate that the notice of a power-supply interruption has been received. The E/O conversion unit 112#i carries out an opto-electrical conversion process to convert a frame from the format of an electrical signal into the format of an optical signal to be transmitted through the transmission line 30#Di.

Next, the operation of the line-termination network shown in FIG. 2 is explained.

Case 1: The Interface Board 26#1 No Longer Used

The DC/DC converter 70 shown in FIG. 4 converts the voltage of −48V supplied by an external power supply into an operating voltage of the interface board 26#i where i=1 to n, outputting the power with the operating voltage to the switch unit 72 which forwards the power to the selector 76 in an ON state. The power-supply-interruption-confirmation-information reception unit 86 keeps the switch unit 72 in the ON state till notices of a power-supply interruption are received from all the interface boards 26#i where i=1 to n. Thus, the switch unit 72 passes on the power with the operating voltage supplied by the DC/DC converter 70 to the selector 76 as long as the switch unit 72 is kept in the ON state. The selector 76 selects the power received from the switch unit 72 when the generation of power by the external power supply is not interrupted, supplying the power to the interface boards 26#i where i=1 to n. As a result, the interface boards 26#i are capable of operating. When a specific interface board 26#1 is no longer used, typically, the person in charge of maintenance turns off the power-supply-interruption switch unit 60#1 employed in the specific interface board 26#1 as shown in FIG. 3. When the power-supply-interruption switch unit 60#1 is turned off, the power-supply-interruption-switch confirmation unit 62#1 informs the power-supply-interruption-bit reception unit 56#1 and the power-supply-interruption-bit insertion unit 44#1 of the power-supply interruption. The O/E conversion unit 50#1 carries out an opto-electrical conversion process to convert a frame with the format of an optical signal received from the line 30#D1 into a frame with the format of an electrical signal. The frame-pulse/clock generation unit 46#1 extracts a clock signal from an array of bits mapped onto a frame output by the O/E conversion unit 50#1 in synchronization with a going-down frame of the format of an electrical signal, outputting a frame pulse indicating the beginning of the going-up frame along with the extracted clock signal.

The frame conversion unit 42#1 converts a going-up frame received from the terminal 20#1 connected to the termination unit 40#1 into a frame prescribed as a frame to be transmitted by the interface board 26#1 to the higher-level interface board 34#1 in synchronization with a clock signal and a frame pulse output by the frame-pulse/clock generation unit 46#1. When receiving a notice of a power-supply interruption, the power-supply-interruption-bit reception unit 56#1 starts the operation of a counter or the like. When receiving a notice of a power-supply interruption, the power-supply-interruption-bit insertion unit 44#1 inserts power-supply-interruption notification 1-bit information into a predetermined bit position of a going-up frame output by the frame conversion unit 42#1 in synchronization with a clock signal and a frame pulse output by the frame-pulse/clock generation unit 46#1. The E/O conversion unit 48# 1 carries out an electro-optical conversion process to convert the signal format of a frame output by the power-supply-interruption-bit insertion unit 44#1 from an electrical signal into an optical signal transmitted to the higher-level interface board 34#1 by way of to the line 30#U1. The O/E conversion unit 90#1 shown in FIG. 5 converts a frame with the format of an optical signal received from the line 30#U1 into a frame with the format of an electrical signal. The termination unit 92#1 terminates an interface between the higher-level interface board 34#1 and the interface board 26#1, receiving the frame of the format of an electrical signal. The power-supply-interruption-notification-bit reception unit 94#1 extracts power-supply-interruption notification 1-bit information from a predetermined bit position in the going-up frame converted into the format of an electrical signal. In this case, since power-supply-interruption notification 1-bit information is contained in the frame, the power-supply-interruption-notification-bit reception unit 94#1 informs the alarm mask processing unit 100#1 and the power-supply-interruption-confirmation-bit insertion unit 110#1 of the power-supply interruption.

The frame conversion unit 96#1 converts a frame received by the termination unit 92#1 from the line 30#U1 into a frame prescribed as a frame to be transmitted by the higher level apparatus 32 to the further-higher-level apparatus 38 such as an exchange station. Receiving a notice of a power-supply interruption from the power-supply-interruption-notification-bit reception unit 94#1, the alarm mask processing unit 100#1 masks an alarm bit of a going-up frame indicating an alarm of an out-off-synchronization state or an alarm of discontinuance of an optical input at a lower level due to a power-supply interruption, transmitting the frame to the exchange station. The termination unit 106#1 terminates an interface for exchanging a frame between the higher-level apparatus 32 and the exchange station. The frame conversion unit 108#1 converts a going-down frame transmitted by the exchange station to the higher level apparatus 32 into a going-down frame prescribed as a frame to be transmitted to the interface board 26#1 by the higher-level interface board 34#1. The power-supply-interruption-confirmation-bit insertion unit 110#1 inserts power-supply-interruption-confirmation 1-bit information into a predetermined bit position in a frame output by the frame conversion unit 108#1. The E/O conversion unit 112#1 carries out an opto-electrical conversion process to convert a frame including power-supply-interruption-confirmation 1-bit information from the format of an electrical signal into the format of an optical signal, transmitting the frame to the interface board 26#1 through the transmission line 30#D1.

The O/E conversion unit 50#1 shown in FIG. 3 converts a frame with the format of an optical signal received from the line 30#D1 into a frame with the format of an electrical signal. The termination unit 52#1 receives the frame having the format of an electrical signal received from the higher-level interface board 34#1. The power-supply-interruption-bit reception unit 56#1 extracts power-supply-interruption-confirmation 1-bit information from a predetermined bit position of the going-down frame output by the termination unit 52#1. If such power-supply-interruption-confirmation 1-bit information is received, the switch unit 66#1 is turned off. In this way, the operation of the interface board 26#1 is halted.

When such power-supply-interruption-confirmation 1-bit information is not received even after a time of a predetermined length has lapsed since reception of a power-supply-interruption notice from the power-supply-interruption-switch confirmation unit 62#1, on the other hand, the power-supply-interruption-bit reception unit 56#1 puts the power-supply-interruption-error LED 58#1 in an ON state to warn the person in charge of maintenance or the like against the state. Confirming that the power-supply-interruption-error LED 58#1 has been turned on, the person in charge of maintenance typically enters a command to retransmit the 1-bit information indicating a power-supply interruption.

When the power-supply-interruption-error LED 58#1 is not turned on, on the other hand, the person in charge of maintenance may then remove the interface board 26#1. In this way, since power supplied to the interface board 26#1 is cut off after the 1-bit information indicating a power-supply interruption-confirmation has been received, the higher level apparatus 32 is allowed to mask an alarm bit accompanying a notice of a power-supply interruption reported to the higher level apparatus 32 with a high degree of reliability before the power is cut off.

Case 2: The Collective Line-Termination Apparatus 24 Itself No Longer Used

When the collective line-termination apparatus 24 itself is no longer used, the person in charge of maintenance or the like turns off the power-supply-interruption switch unit 78 employed in the power-supply board 28 shown in FIG. 4. When the power-supply-interruption switch unit 78 is turned off, the switch confirmation unit 80 informs the power-supply-interruption notification unit 84 of a power-supply interruption. In turn, the power-supply-interruption notification unit 84 notifies all the interface boards 26#i where i=1 to n of the power-supply interruption. Receiving the notice of the power-supply interruption from the power-supply board 28, the power-supply-interruption-notification reception unit 64#i employed in each of the interface boards 26#i informs the power-supply-interruption-confirmation-bit reception unit 56#i and the power-supply-interruption-bit insertion unit 44#i of the power-supply interruption. The power-supply-interruption-bit insertion unit 44#i operates in the same way as Case 1, inserting power-supply-interruption-notification 1-bit information. The higher-level interface board 34#i also operates in the same way as Case 1, inserting power-supply-interruption-confirmation 1-bit information when receiving the power-supply-interruption-notification 1-bit information. The power-supply-interruption-confirmation-bit reception unit 56#i also operates in the same way as Case 1, turning off the switch unit 66#i and informing the power-supply-interruption-notification reception unit 64#i of the reception of the power-supply-interruption-confirmation 1-bit information when receiving power-supply-interruption-confirmation 1-bit information.

The power-supply-interruption-notification reception unit 64#i passes on the notice of the power-supply interruption to the power-supply board 28. The power-supply-interruption-confirmation-bit reception unit 56#i operates in the same way as Case 1, turning on the power-supply-interruption-error LED 58#i if no power-supply-interruption-confirmation 1-bit information is received even after a time with a predetermined length has lapsed since the issuance of the notice of the power-supply interruption by the power-supply-interruption-notification reception unit 64#i. The power-supply-interruption-error LED 58#i is turned on to indicate that no power-supply-interruption-confirmation 1-bit information is received even after a time with the predetermined length has lapsed since the issuance of the notice of the power-supply interruption by the power-supply-interruption-notification reception unit 64#i. If notices of the power-supply interruption are received from all the interface boards 26#i, the power-supply-interruption-confirmation-information reception unit 86 turns off the switch unit 72. Since the switch unit 72 is turned off, the selector 76 does not pass on power supplied by the DC/DC converter 70, cutting off the power supplied to all the interface boards 26#i. If not all notices of the power-supply interruption are received from all the interface boards 26#i, on the other hand, the power-supply-interruptionconfirmation-information reception unit 86 turns on the power-supply-interruption-error LED 58#i to indicate that at least one of the interface boards 26#i did not transmit such a notice. Seeing the power-supply-interruption-error LED 58#i, the person in charge of maintenance typically gives a command to the power-supply board 28 to retransmit a notice of the power-supply interruption.

Case 3: External Power to the Power-Supply Board 28 Cut Off

When power supplied by the external power supply to the power-supply board 28 is cut off, the power-supply-interruption confirmation unit 82 detects the power-supply interruption, informing the power-supply-interruption notification unit 84 and the selector 76 of the power-supply interruption. In this case, the selector 76 selects the voltage of power output by the battery 74, supplying the power to the interface boards 26#i where i=1 to n and components employed in the power-supply board 28. Receiving the power from the battery 74, each of the interface boards 26#i where i=1 to n operates in the same way as Case 2 to inform the higher-level interface board 34#i of the power-supply interruption. The higher-level interface board 34#i masks an alarm bit accompanying the power-supply interruption occurring in the collective line-termination apparatus 24.

As described above, according to the first embodiment, power supplied to a specific interface board employed in the collective line-termination apparatus is cut off after an interface board at the higher level transmits power-supply-interruption-confirmation 1-bit information to the specific interface board. Thus, the interface board at the higher level is capable of informing an apparatus at a further higher level of the power-supply interruption and masking an alarm bit accompanying the power-supply interruption with a high-degree of reliability before the power is cut off. In addition, in case no power-supply-interruption-confirmation 1-bit information was received from the higher-level interface board, a power-supply-interruption error LED is turned on to indicate the fact that no power-supply-interruption-confirmation 1-bit information was received from the higher-level interface board. Thus, the person in charge of maintenance is capable of disposing the problem speedily.

Second Embodiment

Figure 6:
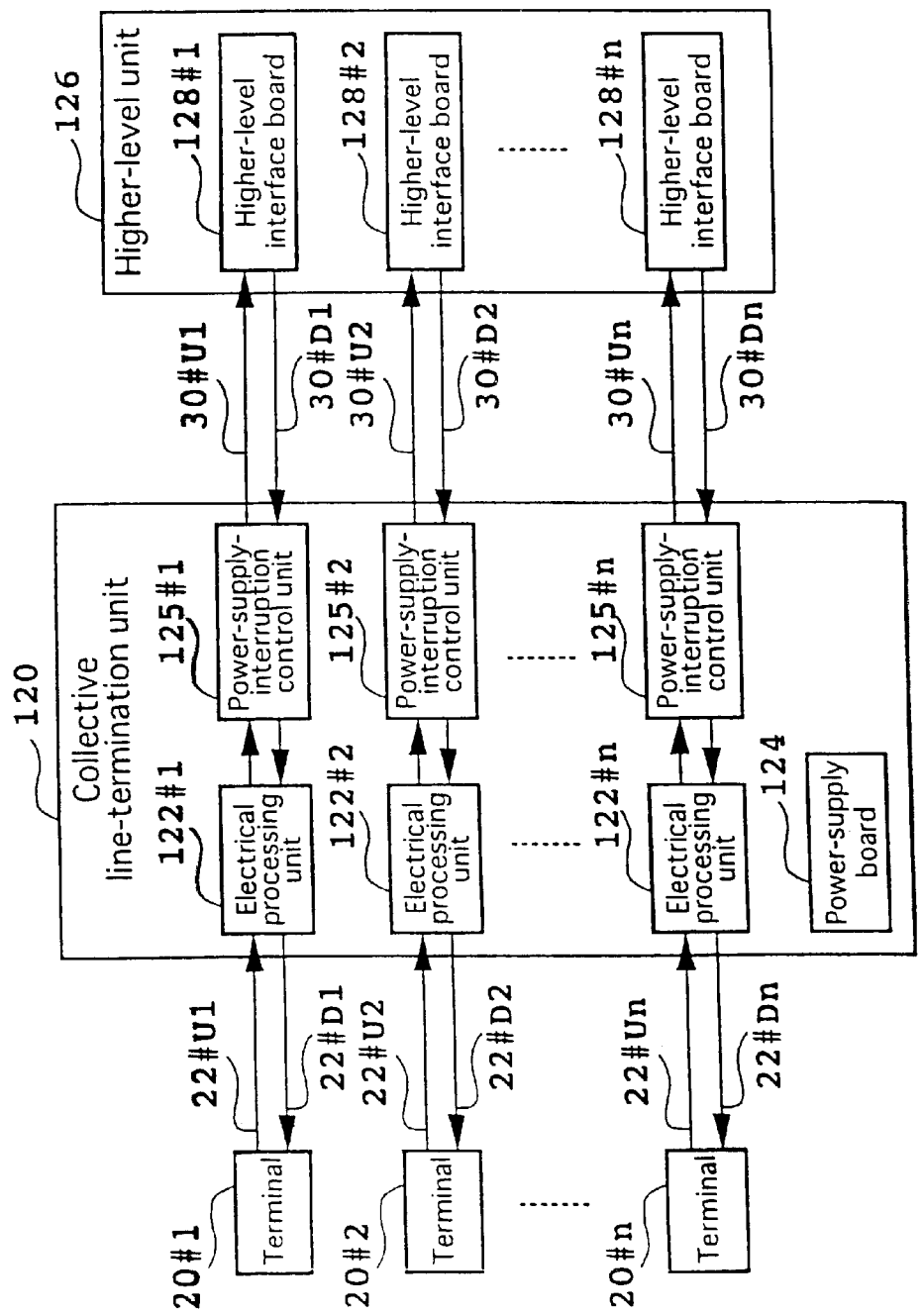
FIG. 6 is a block diagram showing the configuration of a line-termination network implemented by a second embodiment of the present invention.

FIG. 6 is a block diagram showing the configuration of a line-termination network implemented by a second embodiment of the present invention. Elements virtually identical with those employed in the first embodiment shown in FIG. 2 are denoted by the same reference numerals as the latter. The collective line-termination apparatus 120 shown in FIG. 6 is different from the collective line-termination apparatus 24 shown in FIG. 2 in that, in the case of the former, the interface board is implemented by an electrical processing unit 122#i where i=1 to n and a power-supply-interruption control unit 124#i where i=1 to n. In addition, each of the electrical processing units 122#i can be plugged in or pulled out to or from the collective line-termination apparatus 120. Moreover, unlike the interface board employed in the collective termination-line apparatus 24 implemented by the first embodiment, the power-supply-interruption switch is no longer required.

Much like the first embodiment, the second embodiment also has a function to transmit power-supply-interruption-notification 1-bit information to the higher-level apparatus 126. Of course, it is possible to provide the collective line-termination apparatus 120 with, among others, the function to turn off the power supply after power-supply-interruption-confirmation 1-bit information is received from the higher-level apparatus 126. However, the second embodiment does not have this function. Thus, the second embodiment is different from the collective line-termination apparatus 24 and the higher level apparatus 32 employed in the first embodiment shown in FIG. 2 as far as functions relevant to them are concerned. Functions of the electrical processing unit 122#i and the power-supply-interruption control unit 124#i are limited to those absolutely required for reasons seen from the following two points of view. In the first place, it is necessary to make the electrical processing unit 122#i pluggable and removable into and from the collective line-termination apparatus 120. In the second place, when power supplied by an external power supply to the power-supply board 124 is interrupted, it is necessary to supply power from the backup battery 74 employed in the power-supply board 124 to the power-supply-interruption control units 124#i and to drive the power-supply-interruption control units 124#i to inform the higher-level interface boards 128#i of the power-supply interruption and, in order to make the capacity of the battery 74 small, it is necessary to reduce a current supplied to each of the power-supply-interruption control units 124#i. That is to say, from these points of view, each of the power-supply-interruption control units 124#i is provided with only a function to inform the higher-level interface board 128#i of a power-supply interruption, and each of the electrical processing units 122#i is provided with only a function to interface with a terminal 20#i and a higher-level interface board 128#I and is pluggable and removable into and from the collective line-termination apparatus 120.

Figure 7:
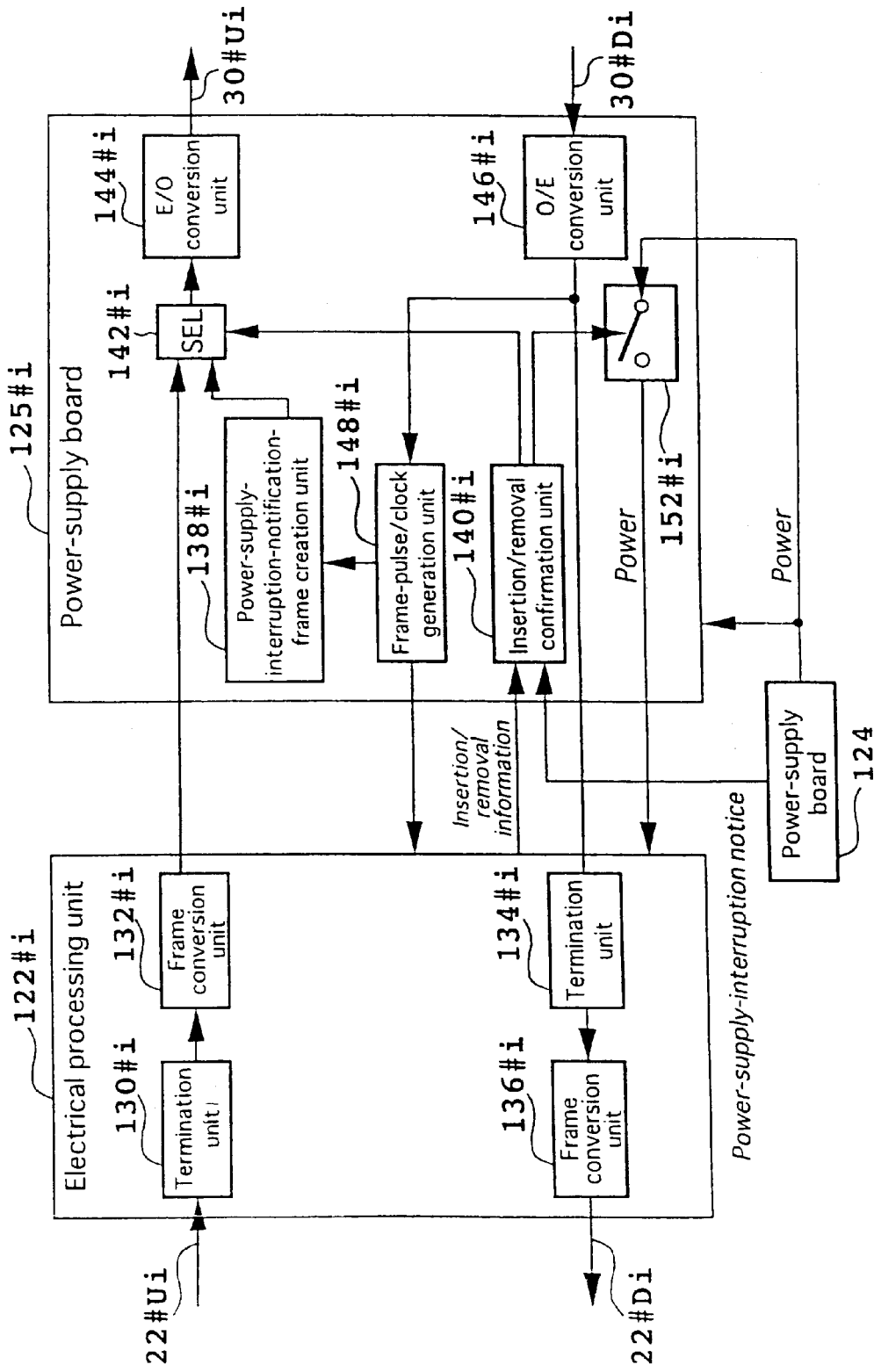
FIG. 7 is a functional block diagram showing the configuration of an electrical processing unit and a power-supply-interruption control unit employed in the line-termination network shown in FIG. 6.

FIG. 7 is a functional block diagram showing the configuration of the electrical processing unit 122#i and the power-supply-interruption control unit 124#i employed in the line-termination network shown in FIG. 6. As shown in FIG. 7, the electrical processing unit 122#i comprises a termination unit 130#i, a frame conversion unit 132#i, a termination unit 134#i, a frame conversion unit 136#i and a switch unit 137#i. The electrical processing unit 122#i terminates an interface between the terminal 20#i and the higher-level interface board 128#i in accordance with the format of an electrical signal. The electrical processing unit 122#i is made of electrical components so that the electrical processing unit 122#i can be plugged into and removed from the collective line-termination apparatus 120. When the electrical processing unit 122#i is no longer used, it is removed from the collective line-termination apparatus 120 and information indicating the removal is supplied to the power-supply-interruption control unit 124#i. The termination unit 130#i terminates an electrical interface between the electrical processing unit 122#i and the terminal 20#i. The frame conversion unit 132#i converts a frame received from the transmission line 22#Ui into a frame prescribed as a frame transmitted to the higher-level interface board 128#i from the power-supply-interruption control unit 124#i in accordance with a clock signal and a frame pulse distributed by the power-supply-interruption control unit 124#i. When the electrical processing unit 122#i is inserted into the collective line-termination apparatus 120, the frame conversion unit 132#i is connected to the power-supply-interruption control unit 124#i by a signal line.

Clock signals and frame pulses are distributed from the power-supply-interruption control unit 124#i for the following reason. As will be described later, since a power-supply-interruption-notification-frame creation unit 138#i employed in the power-supply-interruption control unit 124#i generates a going-up frame including a 1-bit notice of a power-supply interruption independently of the frame conversion unit 132#i, it is necessary to establish synchronization with a frame created by the frame conversion unit 132#i. In addition, it is also necessary to transmit a frame including a 1-bit notice of a power-supply interruption to the higher-level interface board 128#i after the electrical processing unit 122#i is removed. The termination unit 134#i terminates an interface for transmitting a going-down frame converted into the format of an electrical signal and received by the power-supply-interruption control unit 124#i from the higher-level interface board 128#i. The frame conversion unit 136#i converts a frame with the format of an electrical signal received from the going-down transmission line 30#Di into a frame prescribed as a frame exchanged between the terminal 20#i and the collective line-termination apparatus 120#i. When the electrical processing unit 122#i is inserted into the collective line-termination apparatus 120, the frame conversion unit 136#i is connected to the power-supply-interruption control unit 124#i by a signal line. Information on insertion/removal is a signal indicating whether the electrical processing unit 122#i has been inserted into or removed from the collective line-termination apparatus 120. Typically, a terminal of the electrical processing unit 122#i connected to the power-supply-interruption control unit 124#i is grounded, and a terminal of the power-supply-interruption control unit 124#i is connected to a resistor biased by a voltage generated by the power-supply board 124. With such connections, the signal representing the information on insertion/removal is set at a low (LO) level when the electrical processing unit 122#i is inserted into the collective line-termination apparatus 120. With the electrical processing unit 122#i removed from the collective line-termination apparatus 120, on the other hand, the signal representing the information on insertion/removal is set at a high (HI) level. The power-supply-interruption control unit 124#i has a function to transmit a frame including a power-supply-interruption notification bit to the higher-level interface board 128#i when the information on insertion/removal indicates that the electrical processing unit 122#i has been removed from the collective line-termination apparatus 120. In addition, the power-supply-interruption control unit 124#i is also provided with a function to convert a frame having the format of an electrical signal into a frame having the format of an optical signal, and a function to convert a frame having the format of an optical signal into a frame having the format of an electrical signal.

On the other hand, as shown in FIG. 7, the power-supply-interruption control unit 124#i comprises a power-supply-interruption-notification-frame creation unit 138#i, a insertion/removal confirmation unit 140#i, a selector 142#i, an E/O conversion unit 144#i, an O/E conversion unit 146#i, a frame-pulse/clock generation unit 148#i and a switch unit 152#i. The power-supply-interruption-notification-frame creation unit 138#i forms a frame including an electrical-supply-interruption notification bit and a masked alarm bit in accordance with a clock signal and a frame pulse. When the electrical processing unit 122#i is pulled out or a notice of a power-supply interruption is received, the insertion/removal confirmation unit 140#i turns off a switch unit 152#i and drives the selector #142 to select the output of the power-supply-interruption-notification-frame creation unit 138#i in accordance with the information on insertion/removal and the notice of the power-supply interruption. With the electrical processing unit 122#i inserted and no notice of a power-supply interruption received, on the other hand, the switch unit 152#i is turned on and the selector 142#i is driven to select the output of the frame conversion unit 132#i. Driven by the insertion/removal confirmation unit 140#i, the selector 142#i selects the output of the frame conversion unit 132#i or the power-supply-interruption-notification-frame creation unit 138#i. The E/O conversion unit 144#i converts a frame with the format of an electrical signal into a frame with the format of an optical signal. On the other hand, the O/E conversion unit 146#i converts a frame with the format of an optical signal into a frame with the format of an electrical signal. The frame-pulse/clock generation unit 148#i extracts a clock signal from a going-down frame transmitted by the higher-level interface board 128#i and outputs a frame pulse indicating the beginning of a going-up frame transmitted to the higher-level interface board 128#i. The switch unit 152#i is turned on and off in accordance with control executed by the insertion/removal confirmation unit 140#i to pass on or cut off power supplied by the power-supply board 124 to the electrical processing unit 122#i. That is to say, the power is supplied to the electrical processing unit 122#i when the switch unit 152#i is turned on. Thus, when power originally supplied by an external power supply to the power-supply board 124 is cut off as will be described later, the switch unit 152#i is turned off to block power supplied to the electrical processing unit 122#i. As a result, since the power consumption can be reduced, the capacity of the battery 74 can be made smaller.

Figure 8:
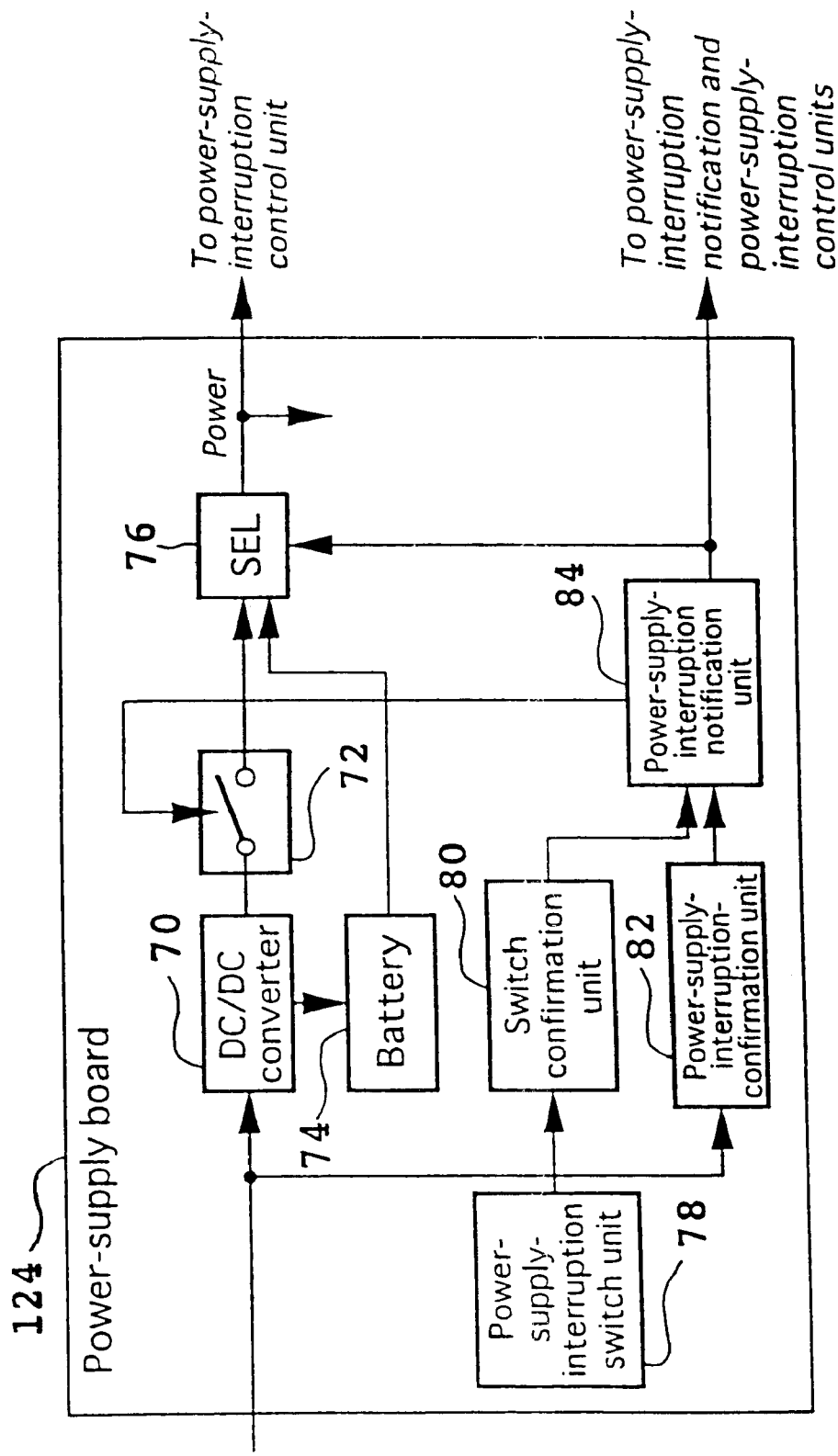
FIG. 8 is a functional block diagram showing the configuration of a power-supply board employed in the line-termination network shown in FIG. 6.

FIG. 8 is a functional block diagram showing the configuration of the power-supply board 124 employed in the line-termination network shown in FIG. 6. Components virtually identical with those employed in the power-supply board 28 shown in FIG. 4 are denoted by the same reference numerals as the latter. The power-supply board 124 shown in FIG. 8 is different from the power-supply board 28 shown in FIG. 4 in that a power-supply-interruption notification unit 84 controls a switch unit 72 to turn on and off. When a notice of a power-supply interruption is received from a switch confirmation unit 80 or a power-supply-interruption confirmation unit 82, the power-supply-interruption notification power-supply-interruption notification unit 84 turns off the switch unit 72 after the lapse of a time corresponding to a period between the reception of the notice of a power-supply interruption and transmission of a frame including an inserted power-supply-interruption notification bit to the higher-level interface board 128#i. If such a notice of a power-supply interruption is not received, on the other hand, the power-supply-interruption notification power-supply-interruption notification unit 84 turns on the switch unit 72.

Next, the operation of the line-termination network shown in FIG. 6 is explained as follows.

Case 1: When power is supplied to the power-supply board 124, a DC/DC converter 70 employed in the power-supply board 124 shown in FIG. 8 converts the direct-current voltage of the power into an operating voltage of the collective line-termination apparatus 120. The power at the operating voltage is supplied to the battery 74 and the switch unit 72. When the collective line-termination apparatus 120 is in use, the power-supply-interruption switch unit 78 is turned on. The switch confirmation unit 80 informs the power-supply-interruption notification unit 84 of the fact that the power-supply-interruption switch unit 78 is turned on. The power-supply-interruption notification unit 84 turns on the switch unit 72 and drives the selector 76 to select the output of the switch unit 72. The selector 76 selects the output of the switch unit 72, forwarding the power to the power-supply-interruption control units 124#i where i=1 to n.

Case 2: When an electrical processing unit 122#i is inserted into the collective line-termination apparatus 120, power is supplied by the power-supply board 124 to the electrical processing unit 122#i. The termination unit 130#i terminates an interface for exchanging a frame received from the transmission line 22#Ui. The frame conversion unit 132#i converts a frame received from the transmission line 22#Ui into a frame prescribed as a frame received from the termination unit 130#i to be transmitted to the higher-level interface board 128#i in accordance with a clock signal and a frame pulse distributed by the power-supply-interruption control unit 124#i. In the mean time, the signal representing the information on insertion/removal is set at typically the LO level to indicate that an electrical processing unit 122#i is inserted into the collective line-termination apparatus 120. Since the signal representing the information on insertion/removal is set at a level to indicate that an electrical processing unit 122#i is inserted into the collective line-termination apparatus 120, the insertion/removal confirmation unit 140#i turns on the switch unit 152#i and outputs a select signal to the selector 142#i, driving the selector 142#i to select the output of the frame conversion unit 132#i. With the switch unit 152#i turned on, the power supplied by the power-supply board 124 is passed on to the electrical processing unit 122#i.

The frame-pulse/clock generation unit 148#i generates a clock signal and a frame pulse from a frame with the format thereof converted into the format of an electrical signal by the O/E conversion unit 146#i. The power-supply-interruption-notification-frame creation unit 138#i forms a frame including an electrical-supply-interruption notification bit and a masked alarm bit of another lower level in accordance with the clock signal and the frame pulse. The selector 142#i selects the output of the frame conversion unit 132#i in accordance with the select signal generated by the insertion/removal confirmation unit 140#i. The E/O conversion unit 144#i converts a frame with the format of an electrical signal output by the selector 142 into a frame having the format of an optical signal which is then supplied to the transmission line 30#Ui. The higher-level interface board 128#i converts the frame received from the line 30#Ui and transmits the frame to an exchange station. On the other hand, a frame with the format received by the collective line-termination apparatus 120 from the higher-level interface board 128#i is converted by the O/E conversion unit 146#i, the termination unit 134#i and the frame conversion unit 136#i into a frame with the format of an electrical signal to be transmitted to the terminal 20#i through the line 22#Di.

Case 3: When the electrical processing unit 122#i is no longer used, typically, the person in charge of maintenance pulls out the electrical processing unit 122#i from the collective line-termination apparatus 120. In this case, the signal representing the information on insertion/removal is set at a level, typically, the HI level indicating that the electrical processing unit 122#i has been taken out from the collective line-termination apparatus 120. Since the signal representing the information on insertion/removal indicates that the electrical processing unit 122#i has been taken out from the collective line-termination apparatus 120, the insertion/removal confirmation unit 140#i turns off the switch unit 152#i and outputs a select signal to the selector 142#i, driving the selector 142#i to select the output of the power-supply-interruption-notification-frame creation unit 138#i. With the switch unit 152#i turned off, power supplied to the electrical processing unit 122#i is cut off. The power-supply-interruption-notification-frame creation unit 138#i always forms a frame including an electrical-supply-interruption notification bit and a masked alarm bit in accordance with a clock signal and a frame pulse. The selector 142#i selects the output of the power-supply-interruption-notification-frame creation unit 138#i in accordance with the select signal received from the insertion/removal confirmation unit 140#i. When the selector 142#i switches the input thereof from the output of the frame conversion unit 132#i to the output of the power-supply-interruption-notification-frame creation unit 138#i, the higher-level interface board 128#i does not observe an out-off-synchronization problem since the timing of the frame output by the frame conversion unit 132#i coincides with the timing of the frame output by the power-supply-interruption-notification-frame creation unit 138#i. The E/O conversion unit 144#i converts a frame with a power-supply-interruption-notification bit selected by the selector 142#i from the format of an electrical signal into the format of an optical signal, transmitting the frame to the higher-level interface board 128#i through the line 30#Ui. Detecting the power-supply-interruption-notification bit, the higher-level interface board 128#i transmits the frame including the power-supply-interruption-notification bit and a masked alarm bit of another lower level to the exchange station through the line 30#Ui.

Case 4: When the collective line-termination apparatus 120 itself is no longer used, the person in charge of maintenance or the like turns off the power-supply-interruption switch unit 78 employed in the power-supply board 124 shown in FIG. 8. When the power-supply-interruption switch unit 78 is turned off, the switch confirmation unit 80 informs the power-supply-interruption notification unit 84 of the fact that the power-supply-interruption switch unit 78 is turned off. In turn, the power-supply-interruption notification unit 84 outputs power-supply-interruption information to the power-supply-interruption control units 124#i where i=1 to n and drives the selector 76 to select power generated by the battery 74. Then, after the lapse of a time with a predetermined length, the power-supply-interruption notification unit 84 turns off the switch unit 72. During the period of time with the predetermined length, the power-supply-interruption information is received by the higher-level interface boards 128#i. Receiving the power-supply-interruption information, the insertion/removal confirmation unit 140#i employed in each power-supply-interruption control unit 124#i operates in the same way as Case 3 in which the electrical processing unit 122#i is pulled out. Thus, each of the power-supply-interruption control units 124#i transmits a frame including a power-supply-interruption notification bit to the higher-level interface board 128#i and the switch unit 152#i employed in the power-supply-interruption control unit 124#i is turned off to cut off power supplied to the electrical processing unit 122#i.

Case 5: When power generated by an external power supply is cut off, the power-supply-interruption confirmation unit 82 informs the power-supply-interruption notification unit 84 of the power-supply interruption. In turn, the power-supply-interruption notification unit 84 drives the selector 76 to select the power generated by the battery 74, and notifies the electrical processing unit 122#i and the power-supply-interruption control unit 124#i of the power-supply interruption. The selector 76 selects the power generated by the battery 74 and supplies the power to the power-supply-interruption control unit 124#i. Receiving the notice of the power-supply interruption, the insertion/removal confirmation unit 140#i employed in the power-supply-interruption control unit 124#i turns off the switch unit 152#i and drives the selector 142#i to select the output of the power-supply-interruption-notification-frame creation unit 138#i. Thus, the higher-level interface board 128#i is informed of the power-supply interruption in the same way as Case 3. At that time, the switch unit 152#i is turned off to allow power generated by the power-supply board 124 to be supplied to the power-supply-interruption control units 124#i only. As a result, the capacity of the battery 74 can be reduced.

According to the second embodiment described above, the power-supply interruption switch is eliminated from the interface board. Instead, since determination of a power-supply interruption is based on removal of an electrical processing unit, it is possible to solve the problem caused by a lack of space for mounting a power-supply interruption switch. In addition, when power supplied by the external power supply to the power-supply board is cut off, no power is supplied to the electrical processing units. As a result, the capacity of the battery can be reduced.

Third Embodiment

Figure 9:
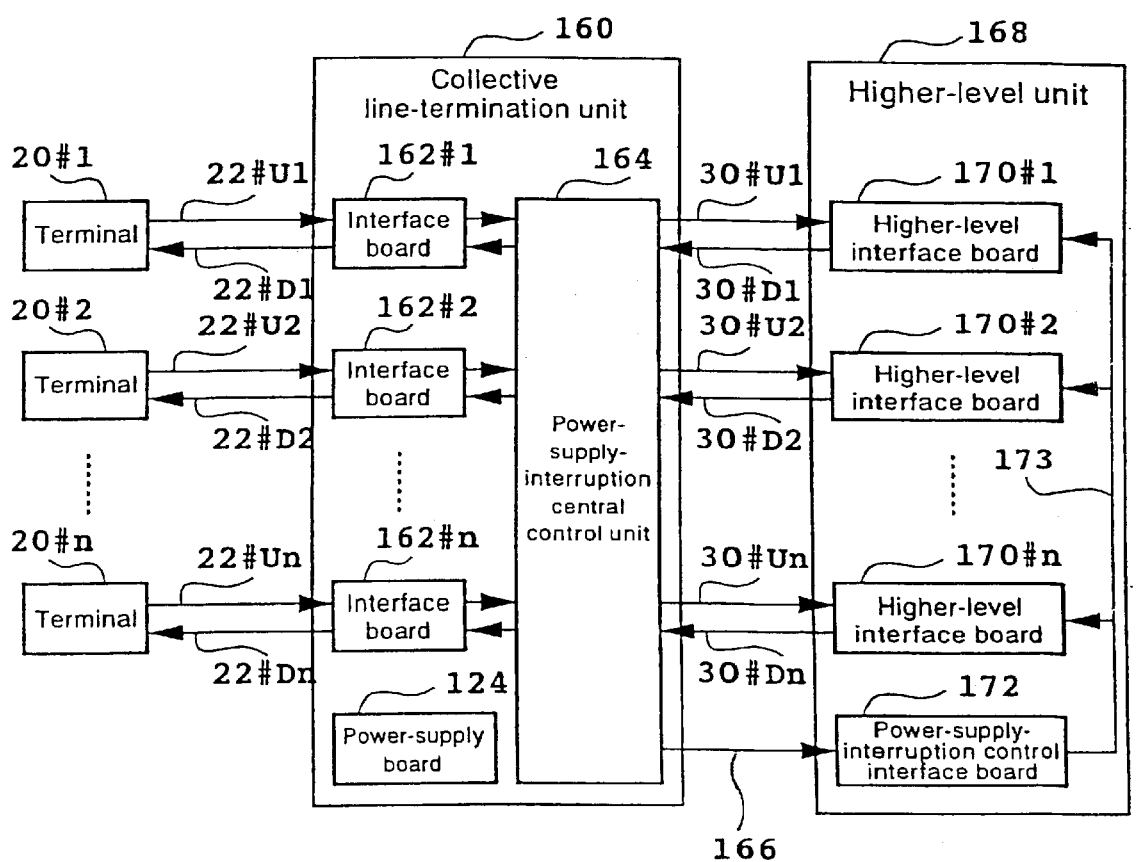
FIG. 9 is a block diagram showing the configuration of a line-termination network implemented by a third embodiment of the present invention.
Figure 10:
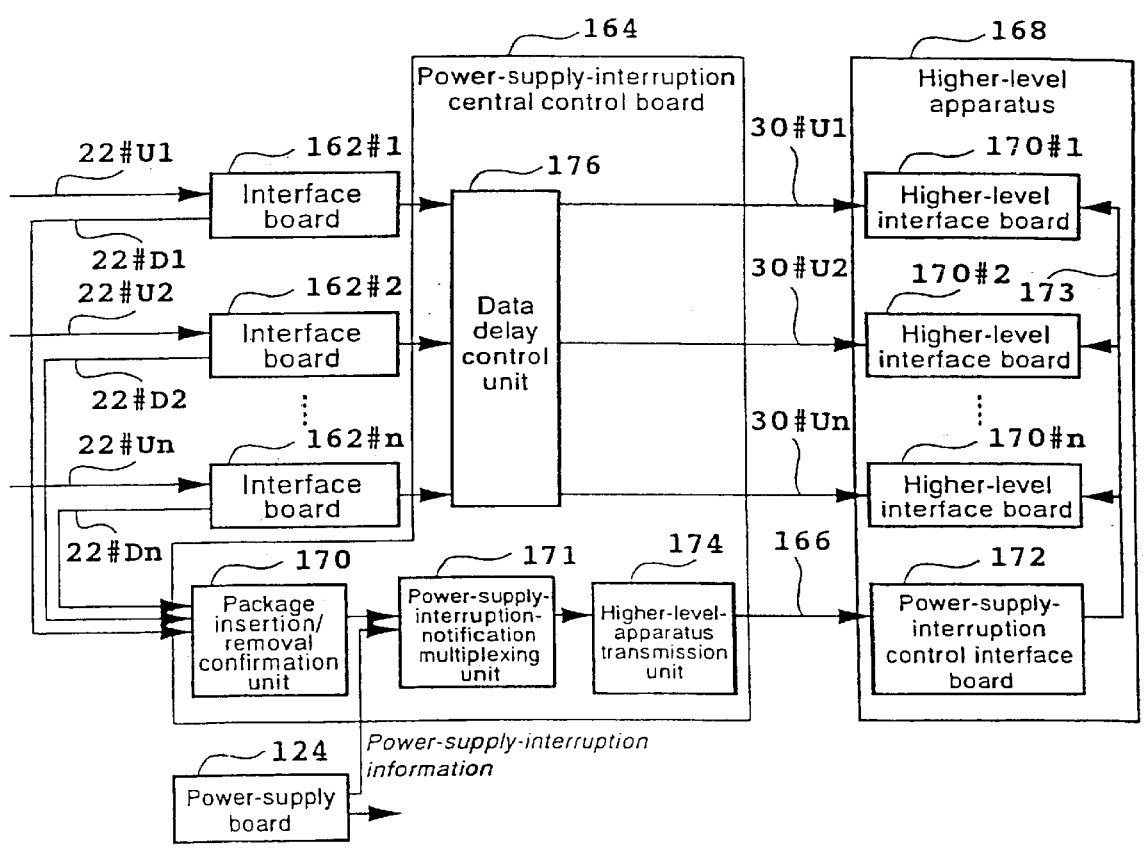
FIG. 10 is a functional block diagram showing the configuration of a power-supply-interruption central control board employed in the line-termination network shown in FIG. 9.

FIG. 9 is a block diagram showing the configuration of a line-termination network implemented by a third embodiment of the present invention. Elements virtually identical with those employed in the first embodiment shown in FIG. 2 are denoted by the same reference numerals as the latter. The apparatus 160 shown in FIG. 9 is different from the collective line-termination apparatus 24 shown in FIG. 2 in that, in the case of the former, pieces of information on insertion/removal generated by interface boards 162#i where i=1 to n are multiplexed by a unit in a single power-supply-interruption central control board 164 for transmitting the information to a higher-level apparatus 168 through a transmission line 166 provided separately. A higher-level apparatus 168 shown in FIG. 9 is also different from the higher level apparatus 32 shown in FIG. 2 in that the former includes a power-supply-interruption control interface board 172 for receiving notices of a power-supply interruption generated by the interface boards 162#i, where i=1 to n, and transmitted by the power-supply-interruption central control board 164 employed in the collective line-termination apparatus 160 through the transmission line 166 and passing on the pieces of information on insertion/retrieval to higher-level interface boards 170#i where i=1 to n through a bus 173. That is, higher-level interface boards 170#i receive the pieces of power supply interruption notification of the interface boards 162#i through the bus 173. FIG. 10 is a functional block diagram showing the configuration of the power-supply-interruption central control board 164 employed in the line-termination network shown in FIG. 9. As shown in FIG. 10, the power-supply-interruption central control board 164 comprises a package-insertion/removal confirmation unit 170, a power-supply-interruption-notification multiplexing unit 171, a higher-level-apparatus transmission unit 174 and a data delay control unit 176. When the interface board 162#i is pulled out as evidenced by the information on insertion/removal indicating that the interface board 162#i is removed, the package-insertion/removal confirmation unit 170 informs the power-supply-interruption-notification multiplexing unit 171 of the power-supply interruption of the interface board 162#i. It should be noted that the information on insertion/removal is the same as that used in the collective line-termination apparatus 120 shown in FIG. 7.

At a request made by the package-insertion/removal confirmation unit 170, the power-supply-interruption-notification multiplexing unit 171 creates a frame including notices of power-supply interruptions of all the interface boards 162#i where i=1 to n in accordance with information on a power-supply interruption supplied by the power-supply board 124. It should be noted that the frame including information on a power-supply interruption may have the same format as or a different format from that of a frame prescribed as an going-up frame transmitted from the interface board 162#i to the higher-level interface board 170#i. Typically, predetermined bits are each allocated to an interface board 162#i as a power-supply-interruption notification bit for the interface board 162#i. The higher-level-apparatus transmission unit 174 outputs the frame generated by the power-supply-interruption-notification multiplexing unit 171 to the transmission line 166 in accordance with a physical interface prescribed as an interface between the power-supply-interruption central control board 164 and the power-supply-interruption control interface board 172. The data delay control unit 176 outputs a going-up frame, which is transmitted by an interface board 162#i to be removed to a higher-level interface board 170#i, to a transmission line 30#Ui. The going-up frame is output to the transmission line 30#Ui by always delaying an arrival time of an insertion/removal notice at the higher-level interface board 170#i. The insertion/removal notice is output by the power-supply-interruption central control board 164 prior to detection of the alarm by the higher-level interface board 170#i at the time the interface board 162#i is removed. On the other hand, the data delay control unit 176 also passes on a going-down frame received from a transmission line 30#Di to the interface board 162#i without a delay. The arrival of a going-up frame at the higher-level interface board 170#i is delayed to give a time to the higher-level interface board 170#i to mask a lower-level alarm in accordance with reception of a notice of a power-supply interruption from the interface board 162#i by the higher-level interface board 170#i prior to reception of a possibly abnormal going-up frame which is out off synchronization due to the removal of the interface board 162#i. The transmission line 166 is a transmission line used specially for transmitting a notice of a power-supply interruption to the power-supply-interruption control interface board 172. Typically, the transmission line 166 is implemented by an electrical-signal cable.

Figure 11:
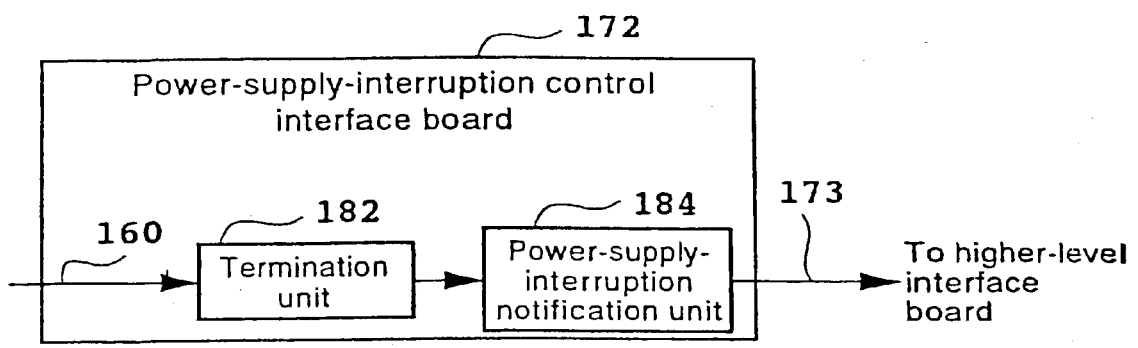
FIG. 11 is a functional block diagram showing the configuration of a power-supply-interruption control interface board employed in a higher-level apparatus shown in FIG. 10.

FIG. 11 is a functional block diagram showing the configuration of the power-supply-interruption control interface board 172 employed in the higher-level apparatus 168 shown in FIG. 9. As shown in FIG. 11, the power-supply-interruption control interface board 172 comprises a termination unit 182 and a power-supply-interruption notification unit 184. The termination unit 182 terminates an interface for exchanging a frame. The power-supply-interruption notification unit 184 fetches power-supply-interruption-notification bits of interface boards 162#i for the higher-level interface boards 170#i from the frame, and informs the higher-level interface boards 170#i of the power-supply interruptions through the bus 173. Typically, the bus 173 is a bus common to the higher-level interface boards 170#i. In this case, the information on a power-supply interruption comprises a head flag, the address of each higher-level interface boards 170#i or a number#i, an array of power-supply-interruption notification bits and an end flag.

Figure 12:
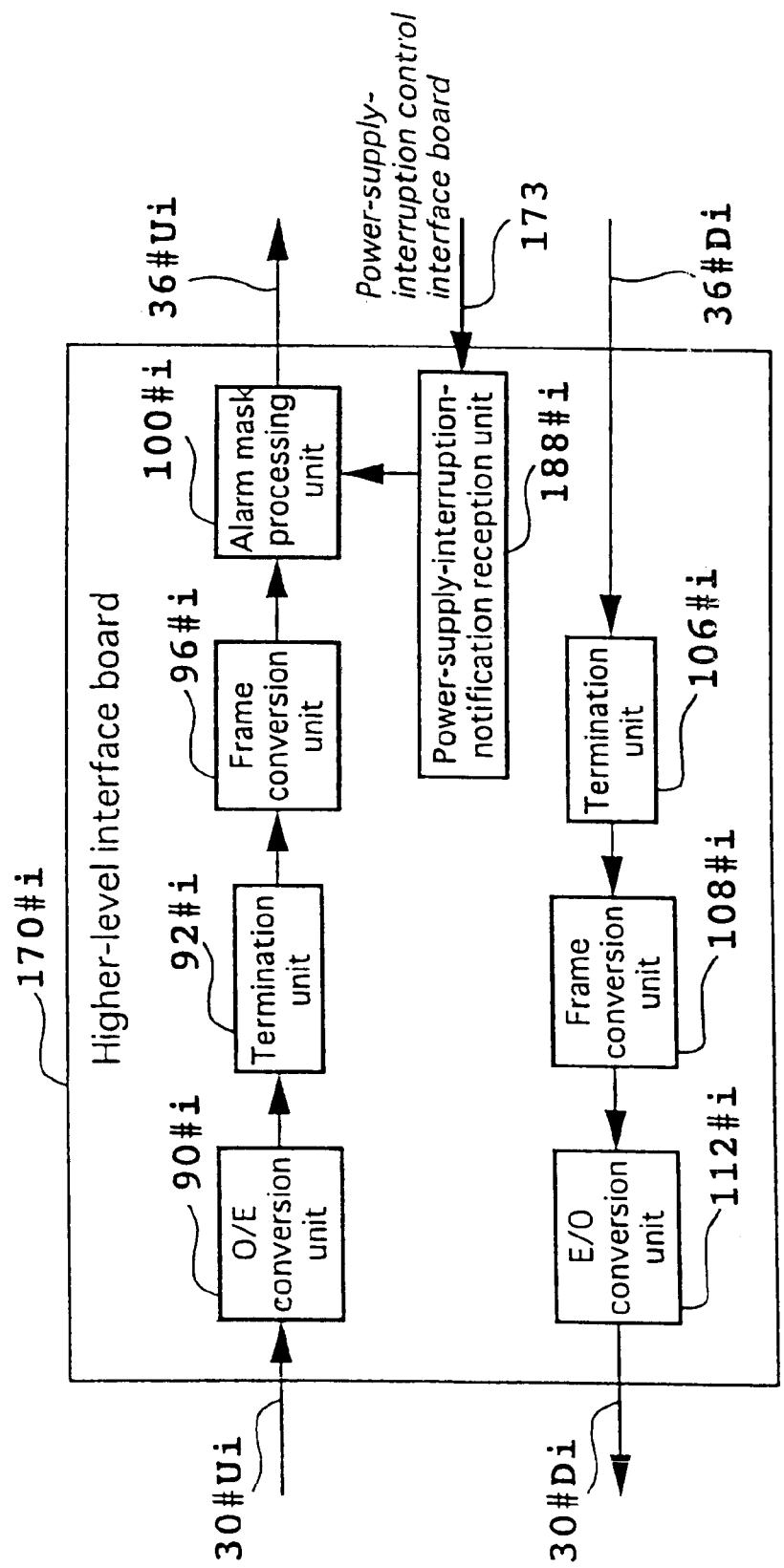
FIG. 12 is a functional block diagram showing the configuration of a higher-level interface board employed in the higher-level apparatus shown in FIG. 10.

FIG. 12 is a functional block diagram showing the configuration of the higher-level interface board 170#i employed in the higher-level apparatus 168 shown in FIG. 9. Elements virtually identical with those employed in the higher-level interface board 34#i shown in FIG. 5 are denoted by the same reference numerals as the latter. The higher-level interface board 170#i shown in FIG. 12 is different from the higher-level interface board 34#i shown in FIG. 5 in that the former employs a power-supply-interruption-notification reception unit 188#i but gets rid of the power-supply-interruption-confirmation-bit insertion unit 110#i. It should be noted, however, that the power-supply-interruption-confirmation-bit insertion unit 110#i may of course be employed. The power-supply-interruption-notification reception unit 188#i examines information on a power-supply interruption received from the bus 173 to form a judgment as to whether or not power supplied to the interface board 162#i has been interrupted. If interrupted, an alarm mask processing unit 100#i is notified of such a power-supply interruption.

The operation of the line-termination network shown in FIG. 9 is explained as follows.

Case 1: With the interface board 162#i inserted into the collective line-termination apparatus 160, the interface board 162#i converts a frame received from the terminal 20#i into a frame to be transmitted by the collective line-termination apparatus 160 to the higher-level interface board 170#i, supplying the resulting frame to the power-supply-interruption central control board 164. Since the interface board 162#i is inserted into the collective line-termination apparatus 160, the information on insertion/removal indicates that the interface board 162#i has been inserted into the collective line-termination apparatus 160. The package-insertion/removal confirmation unit 170 shown in FIG. 10 informs the power-supply-interruption-notification multiplexing unit 171 of the fact that the interface board 162#i has been inserted into the collective line-termination apparatus 160. The power-supply-interruption-notification multiplexing unit 171 turns off a power-supply-interruption notification bit for the interface board 162#i at a predetermined position in a frame. The higher-level-apparatus transmission unit 174 outputs the frame received from the power-supply-interruption-notification multiplexing unit 171 to the transmission line 166.

The termination unit 182 employed in the power-supply-interruption control interface board 172 shown in FIG. 11 terminates the interface for exchanging the frame. The power-supply-interruption notification unit 184 fetches the power-supply-interruption-notification bit for each of the interface boards 162#i from the frame and forms a judgment as to whether or not power supplied to the interface board 162#i has been interrupted. Then, the power-supply-interruption notification unit 184 creates a frame including interruption information comprising a head flag, the address of each interface board 162#i, an array of power-supply-interruption notification bits and an end flag. The frame is then output to the bus 173. In this case, the power-supply-interruption notification bit indicates that no interruption was detected in the interface boards 162#i.

The power-supply-interruption-notification reception unit 188#i employed in the higher-level interface board 170#i shown in FIG. 12 fetches a power-supply-interruption notification bit corresponding to an address for the higher-level interface board 170#i itself from the frame received from the bus 173 and informs the alarm mask processing unit 100#i of the value of the bit. In this case, the value of the bit indicates no power-supply interruption. Thus, the alarm mask processing unit 100#i transmits a frame received from the frame conversion unit 96#i to an exchange station without masking an alarm bit.

Case 2: A no longer used interface board 162#1 is pulled out from the collective line-termination apparatus 160. When the interface board 162#1 is pulled out from the collective line-termination apparatus 160, the package-insertion/removal confirmation unit 170 informs the power-supply-interruption-notification multiplexing unit 171 of a power-supply interruption for the interface board 162#1 by means of the insertion/removal information. The power-supply-interruption-notification multiplexing unit 171 turns on a power-supply-interruption-notification bit for the interface board 162#1 at a predetermined position in a frame. The higher-level-apparatus transmission unit 174 transmits a frame produced by the power-supply-interruption-notification multiplexing unit 171 to the power-supply-interruption control interface board 172 through the transmission line 166. The termination unit 182 employed in the power-supply-interruption control interface board 172 shown in FIG. 11 terminates the interface for exchanging a frame. On the other hand, the power-supply-interruption notification unit 184 fetches the power-supply-interruption-notification bit for each of the interface boards 162#1 from the frame and forms a judgment as to whether or not power supplied to the interface board 162#1 has been interrupted. Then, the power-supply-interruption notification unit 184 creates a frame including interruption information comprising a head flag, the address of interface board 162#i and an end flag. The frame is then output to the bus 173. In this case, the power-supply-interruption notification bit is turned on to indicate that a power-supply interruption was detected in the interface board 162#1.

The power-supply-interruption-notification reception unit 188#1 employed in the higher-level interface board 170#1 shown in FIG. 12 fetches a power-supply-interruption notification bit corresponding to an address for the higher-level interface board 170#1 itself from the frame received from the bus 173 and informs the alarm mask processing unit 100#1 of the value of the bit indicating whether or not there is a power-supply interruption. In this case, the value of the bit indicates a power-supply interruption. Thus, the alarm mask processing unit 100#1 transmits a frame received from the frame conversion unit 96#1 to an exchange station by masking an alarm bit of a lower level. When an interface board 162#1 is pulled out from the collective line-termination apparatus 160, on the other hand, a terminal of the power-supply-interruption central control board 164 of the data delay control unit 176 connected to the interface board 162#1 is opened. Thus, an abnormal frame is received by the data delay control unit 176. The data delay control unit 176 delays this abnormal frame by a predetermined time equal in length to a time lapse between the removal of the of the interface board 162#1 and the reception of a notice of the power-supply interruption by the higher-level interface board 170#1, and then outputs the delayed abnormal frame to the transmission line 30#U1. In this way, the power-supply interruption of the interface board 162#1 is reported to the higher-level interface board 170#1 and the alarm bit is masked by the alarm mask processing unit 100#1 employed in the higher-level interface board 170#1 prior to the transmission of the abnormal frame caused by the removal of the interface board 162#1 to the higher-level interface board 170#1.

Case 3: When the collective line-termination apparatus 160 itself is no longer used, the power-supply-interruption switch unit 78 employed in the power-supply board 124 is turned off and the power-supply-interruption-notification multiplexing unit 171 employed in the power-supply-interruption central control board 164 is informed of a power-supply interruption. The power-supplyinterruption-notification multiplexing unit 171 creates a frame indicating a power-supply interruption for all the interface boards 162#i where i=1 to n, transmitting the frame to the power-supply-interruption control interface board 172 through the higher-level-apparatus transmission unit 174 and the transmission line 166. The power-supply-interruption control interface board 172 operates in the same way as Case 2, transmitting a notice of a power-supply interruption for all the interface boards 162#i where i=1 to n to the higher-level interface boards 170#i through the bus 173. The higher-level interface boards 170#i where i=1 to n each insert a power-supply-interruption notification bit and mask an alarm bit of the lower level.

Case 4: When the power supplied by the external power supply of the power-supply board 124 is cut off, the same operations as Case 3 are carried out.

According to the third embodiment described above, the same effects as the second embodiment are obtained.

Fourth Embodiment

Figure 13:
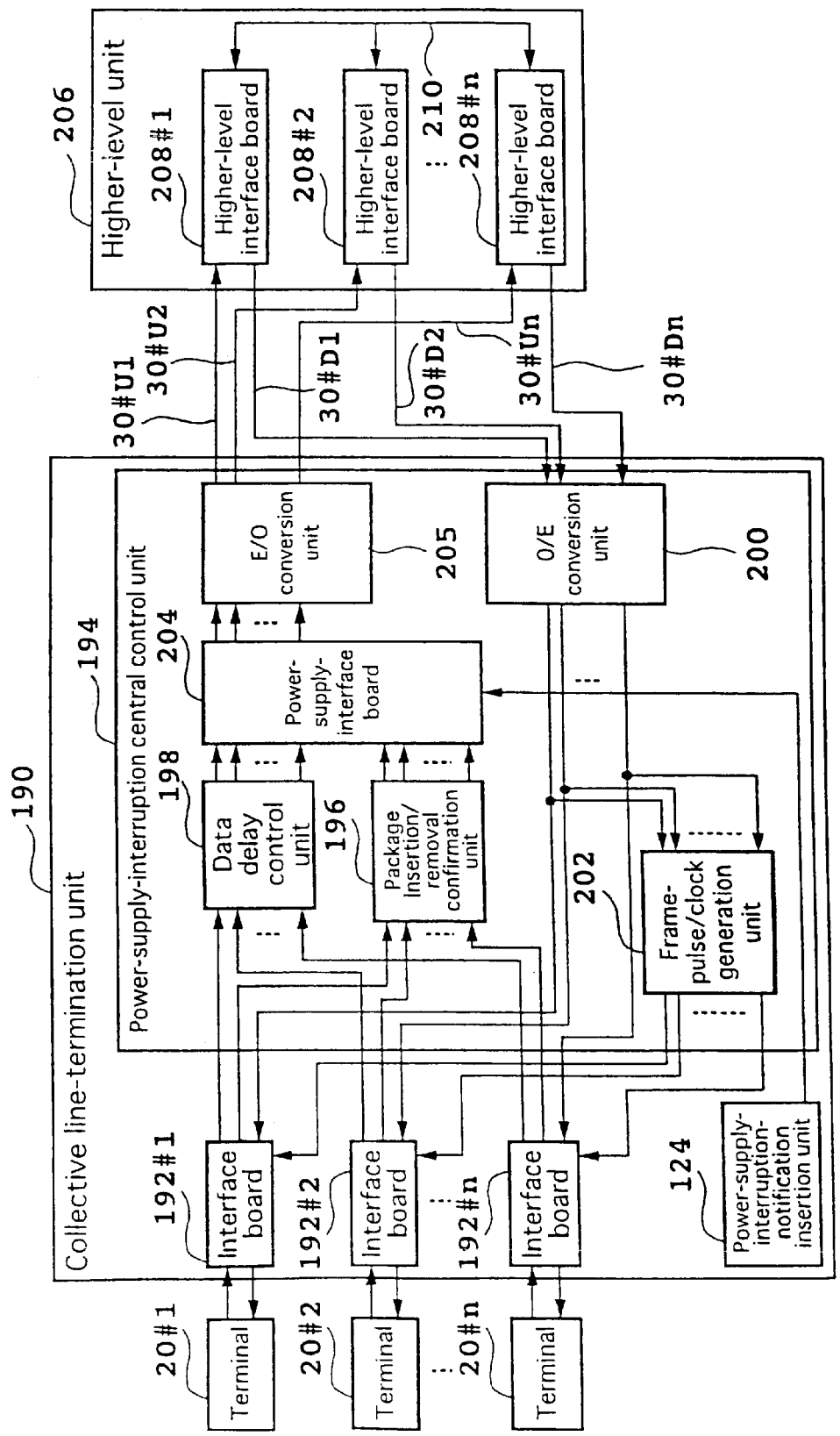
FIG. 13 is a block diagram showing the configuration of a line-termination network implemented by a fourth embodiment of the present invention.

FIG. 13 is a block diagram showing the configuration of a line-termination network implemented by a fourth embodiment of the present invention. Elements virtually identical with those employed in the first embodiment shown in FIG. 2 are denoted by the same reference numerals as the latter. The collective line-termination apparatus 190 shown in FIG. 13 is different from the collective line-termination apparatus 24 shown in FIG. 2 in that, in the case of the former, when a notice of a power-supply interruption is received from the power-supply board 124, a frame including a power-supply-interruption notification bit for an interface board 192# i is transmitted to each interface board 208#j through a transmission line 30#Uj and, when an interface board 192# i is pulled out from the collective line-termination apparatus 190, a frame including a power-supply-interruption notification bit for the interface board 192#i is transmitted to each interface board 208#j through a transmission line 30#Uj where j≈i in accordance with information on removals of the interface boards 192#i where i=1 to n. In addition, the collective line-termination apparatus 190 shown in FIG. 13 is also different from the collective line-termination apparatus 24 shown in FIG. 2 in that, in the case of the former, E/O conversion units for the interface boards 192#i where i=1 to n are all integrated in a power-supply-interruption central control board 194 which is similar to the power-supply-interruption central control board 164 employed in the collective line-termination apparatus 160 of the third embodiment shown in FIG. 9. The higher-level interface board 208#i shown in FIG. 13 is different from the higher-level interface board 34#i shown in FIG. 2 in that, when the higher-level interface board 208#i receives a frame including a power-supply-interruption notification bit for another interface board 192#j where j≈i from a transmission line 30#Ui, the higher-level interface board 208#i notifies another interface board 208#j of the power-supply interruption through a bus 210.

Each of the interface boards 192#i where i=1 to n converts a frame into a frame with the format of an electrical transmission line in accordance with a clock signal and a frame pulse received from the power-supply-interruption central control board 194, outputting the frame to the power-supply-interruption central control board 194. On the other hand, the interface board 192#i converts a frame received from the power-supply-interruption central control board 194 into a frame for transmission to the terminal 20#i through the transmission line 22#Di. The interface board 192#i also outputs information on insertion/removal of the interface board 192#i to the power-supply-interruption central control board 194. As shown in FIG. 13, the power-supply-interruption central control board 194 comprises a package-insertion/removal confirmation unit 196, a data delay control unit 198, a O/E conversion unit 200, a frame-pulse/clock generation unit 202, a power-supply-interruption-notification insertion unit 204 and a E/O conversion unit 205. When the information on insertion/removal of the interface boards 192#i where i=1 to n indicates that an interface board 192#i is taken out, the package-insertion/removal confirmation unit 196 notifies the power-supply-interruption-notification insertion unit 204 of the removal of the interface board 192#i. The data delay control unit 198 delays a frame received from each interface board 192#i by a time equal in length to a period between the removal of the interface board 192#i and the arrival of information on a power-supply interruption of the interface board 192#i at the higher-level interface board 208#i. Typically, the delay time is equal to a multiple of the frame period of the transmission line 30#Ui.

The O/E conversion unit 200 converts a frame with the format of an optical signal received from the transmission line 30#Di into a frame having the format of an electrical signal. The frame-pulse/clock generation unit 202 extracts a clock signal from a frame which is received from the higher-level interface board 208#i and has its format converted into that of an electrical signal by the O/E conversion unit 200 and generates a frame pulse. The clock signal and the frame pulse are then supplied to the interface boards 192#i. When the package-insertion/removal confirmation unit 196 outputs a notice of a power-supply interruption for an interface board 192#i, the power-supply-interruption-notification insertion unit 204 sets information on a power-supply interruption indicating the occurrence of the power-supply interruption in the interface board 192#i in a frame j transmitted by the interface board 192#j by way of the data delay control unit 198#i.

Information on a power-supply interruption indicating the occurrence of the power-supply interruption in an interface board 192#i can typically be set in a frame j as a power-supply-interruption notification bit at a predetermined bit position for the interface board 192#i. The bit is usually an unused bit in the frame j. As an alternative, such information can be set as the address of an interface board 192#i in which the power-supply interruption has occurred. The address of an interface board 192#i is typically represented by the number i of the reference numeral 192#i. Assume that the former way of setting the information is adopted.

In addition, when a notice of a power-supply interruption is received from the power-supply board 124, the power-supply-interruption-notification insertion unit 204 inserts the notice into the power-supply-interruption notification bits for the interface boards 192#i in frames of all the interface boards 192#i output by the data delay control unit 198. The E/O conversion unit 205 converts a frame supplied by an interface board 192#i by way of the power-supply-interruption-notification insertion unit 204 from the format of an electrical signal into the format of an optical signal.

Figure 14:
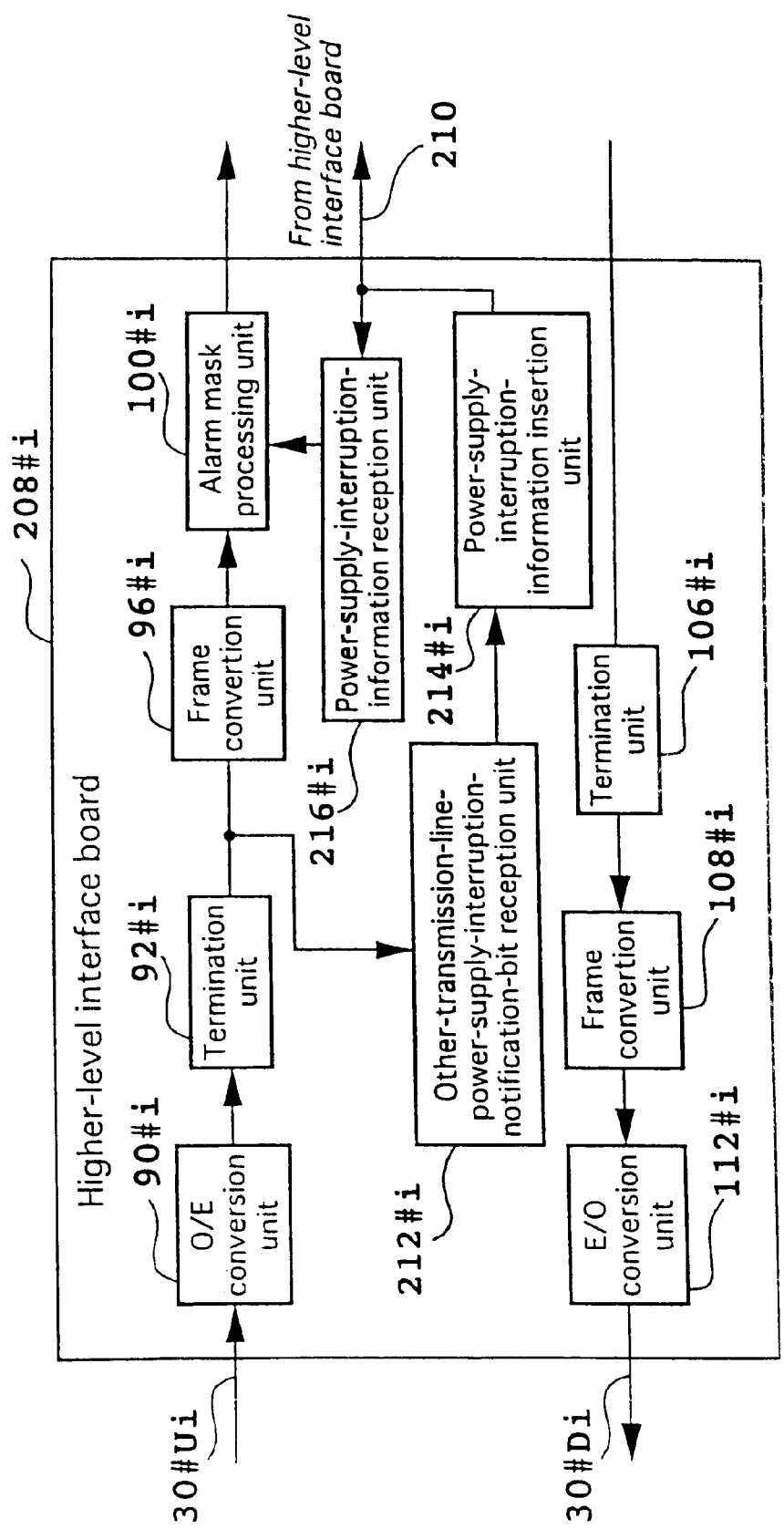
FIG. 14 is a functional block diagram showing the configuration of a higher-level interface board employed in the line-termination network shown in FIG. 13.

FIG. 14 is a functional block diagram showing the configuration of the higher-level interface board 208#i employed in the line-termination network shown in FIG. 13. Components virtually identical with those employed in the higher-level interface board 34#i shown in FIG. 5 are denoted by the same reference numerals as the latter. An other-transmission-line-power-supply-interruption-notification-bit reception unit 212#i fetches a power-supply interruption notification from the bit of another interface board 192#j where j≠i from a frame received from the transmission line 30#Ui. If the bit includes a power-supply interruption notification of another interface board 192#j, a power-supply-interruption-information insertion unit 214#i is informed of the power-supply interruption. The power-supply-interruption-information insertion unit 214#i in turn notifies the higher-level interface board 208#j of information on the power-supply interruption of the interface board 192#j through the bus 210. The information typically comprises the address of the higher-level interface board 208#j and a 1-bit notice of the power-supply interruption. In this case, there may be a contention for the bus 210 with another power-supply-interruption-information insertion unit 214#k where k≠i. Typically, such a contention problem can be solved by using a polling technique. The power-supply-interruption-information reception unit 216#j employed in the higher-level interface board 208#j receives the power-supply-interruption information from the bus 210. If the power-supply-interruption information includes the address of the higher-level interface board 208#j, the power-supply interruption is reported to the alarm mask processing unit 100#j.

On the other hand, a power-supply-interruption-information reception unit 216#i checks information on a power-supply interruption received from the bus 210 to determine whether or not the information contains the address of the higher-level interface board 208#i. If the information contains the address of the higher-level interface board 208#i, a notice of the power-supply interruption is passed on to the alarm mask processing unit 100#i.

Next, the operation of the line-termination network shown in FIG. 13 is explained.

Case 1: When an interface board 192#i is inserted into the collective line-termination apparatus 190, the interface board 192#i converts a frame into a proper format in accordance with a frame pulse and a clock signal, supplying the converted frame to the data delay control unit 198. The package-insertion/removal confirmation unit 196 does not indicate a power-supply interruption of the interface board 192#i. The data delay control unit 198 delays the frame received from the interface board 192#i by a predetermined time before supplying the frame to the power-supply-interruption-notification insertion unit 204. Since the package-insertion/removal confirmation unit 196 does not indicate a power-supply interruption of the interface board 192#i, the power-supply-interruption-notification insertion unit 204 passes through the output of the data delay control unit 198 as it is for transmission to the higher-level interface board 208#i.

Case 2: The interface board 192#1 is no longer used, hence, being pulled out from the collective line-termination apparatus 190. When the interface board 192#1 is pulled out from the collective line-termination apparatus 190, the package-insertion/removal confirmation unit 196 detects the removal from information on insertion/removal of the interface boards 192#1, indicating a power-supply interruption. The data delay control unit 198 delays frames received from the interface boards 192#i where i=1 to n by a predetermined time before supplying the frames to the power-supply-interruption-notification insertion unit 204. Informed of the power-supply interruption of the interface board 192#1, the power-supply-interruption-notification insertion unit 204 inserts a power-supply-interruption notification for the interface board 192#1 into a predetermined bit in each of the frames of the interface board 192#j where j=2 to n generated by the data delay control unit 198, and outputs the frames to the transmission line 30#Uj.

The other-transmission-line-power-supply-interruption-notification-bit reception unit 212#j employed in each of the interface boards 208#j shown in FIG. 14 where j=2 to n, detects the power-supply-interruption notification bit of the interface board 192#1 in the frame and notifies the power-supply-interruption-information insertion unit 214#j of the power-supply interruption. Informed of the power-supply interruption of the interface board 192#1, the power-supply-interruption-information insertion unit 214#j sets the address of the interface board 192#1 in the information on the power-supply interruption, transferring the information to the bus 210 through control of contention for the bus 210 with the other interface boards 208#j. The power-supply-interruption-information reception unit 216#1 employed in the board 208#1 checks the information on a power-supply interruption received from the bus 210 to determine whether or not the information contains an address of the higher-level interface board 208#1. Since the information contains the address of the higher-level interface board 208#1, a notice of the power-supply interruption is passed on to the alarm mask processing unit 100#1. The alarm mask processing unit 100#1 masks an alarm bit of the lower level and transmits the frame to the exchange station. In this case, since the higher-level apparatus 206 is notified of the power-supply interruption before the higher-level interface board 208#1 receives an abnormal frame caused by the removal of the interface board 192#1, the alarm bit of the lower level is masked. As a result, no incorrect alarm is reported to the higher-level apparatus 206 due to the removal of the interface board 192#1.

Case 3: When the collective line-termination apparatus 190 itself is no longer used, the power-supply-interruption switch unit 78 employed in the power-supply board 124 is turned off and the power-supply-interruption-notification insertion unit 204 is informed of a power-supply interruption. The power-supply-interruption-notification insertion unit 204 inserts a power-supply-interruption notification for the interface board 192#i into a predetermined bit in each of frames of the interface boards 192#i generated by the data delay control unit 198, and outputs the frame to the transmission line 30#Ui. A power-supply-interruption-notification-bit reception unit employed in the higher-level interface board 208#i but shown in none of the figures detects the power-supply-interruption notification bit, notifying the alarm mask processing unit 100#i of the power-supply interruption. Informed of the power-supply interruption, the alarm mask processing unit 100#i masks the alarm bit of the lower level.

Case 4: When power generated by an external power supply of the power-supply board 124 is cut off, a switch unit of the interface board 192#i is turned off to halt the operation of the interface board 192#i. The power-supply-interruption central control board 194 informs the higher-level interface board 208#i of the power-supply interruption in the same way as Case 3.

As described above, the fourth embodiment provides the same effects as the second embodiment.

Fifth Embodiment

Figure 15:
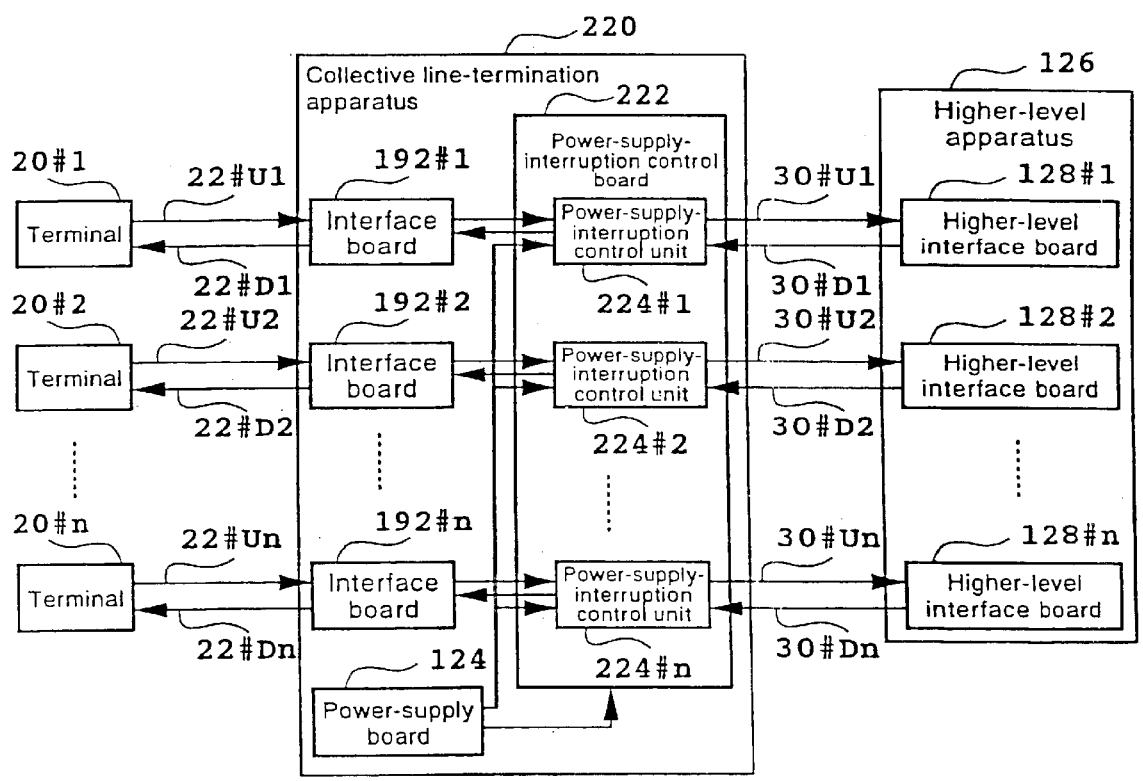
FIG. 15 is a block diagram showing the configuration of a line-termination network implemented by a fifth embodiment of the present invention.

FIG. 15 is a block diagram showing the configuration of a line-termination network implemented by a fifth embodiment of the present invention. Elements virtually identical with those employed in the fourth embodiment shown in FIG. 13 are denoted by the same reference numerals as the latter. A collective line-termination apparatus 220 shown in FIG. 15 is different from the collective line-termination apparatus 190 shown in FIG. 13 in that, in the case of the former, a notice of a power-supply interruption caused by removal of any interface board 192#i where i=1 to n is transmitted to a higher-level apparatus 126 through a transmission line Ui for the interface board 192#i itself. The higher-level apparatus 126 shown in FIG. 15 is different from the higher-level apparatus 206 shown in FIG. 13 in that the former does not include the bus 210 shown in FIG. 13. Finally, a higher-level interface board 128#i shown in FIG. 15 is different from the higher-level interface board 208#i shown in FIG. 14 in that in the former does not include the other-transmission-line-power-supply-interruption-information notification unit 212#i, the power-supply-interruption-information insertion unit 214#i and the power-supply-interruption-information reception unit 216#i. As shown in FIG. 15, a power-supply-interruption control board 222 has a power-supply-interruption control unit 224#i where i=1 to n for the interface boards 192#i where i=1 to n respectively. The power-supply-interruption control unit 224#i is connected to the interface boards 192#i. The power-supply-interruption control unit 224#i is also connected to the higher-level apparatus 126 by the transmission lines 30#Ui and 30#Di.

Figure 16:
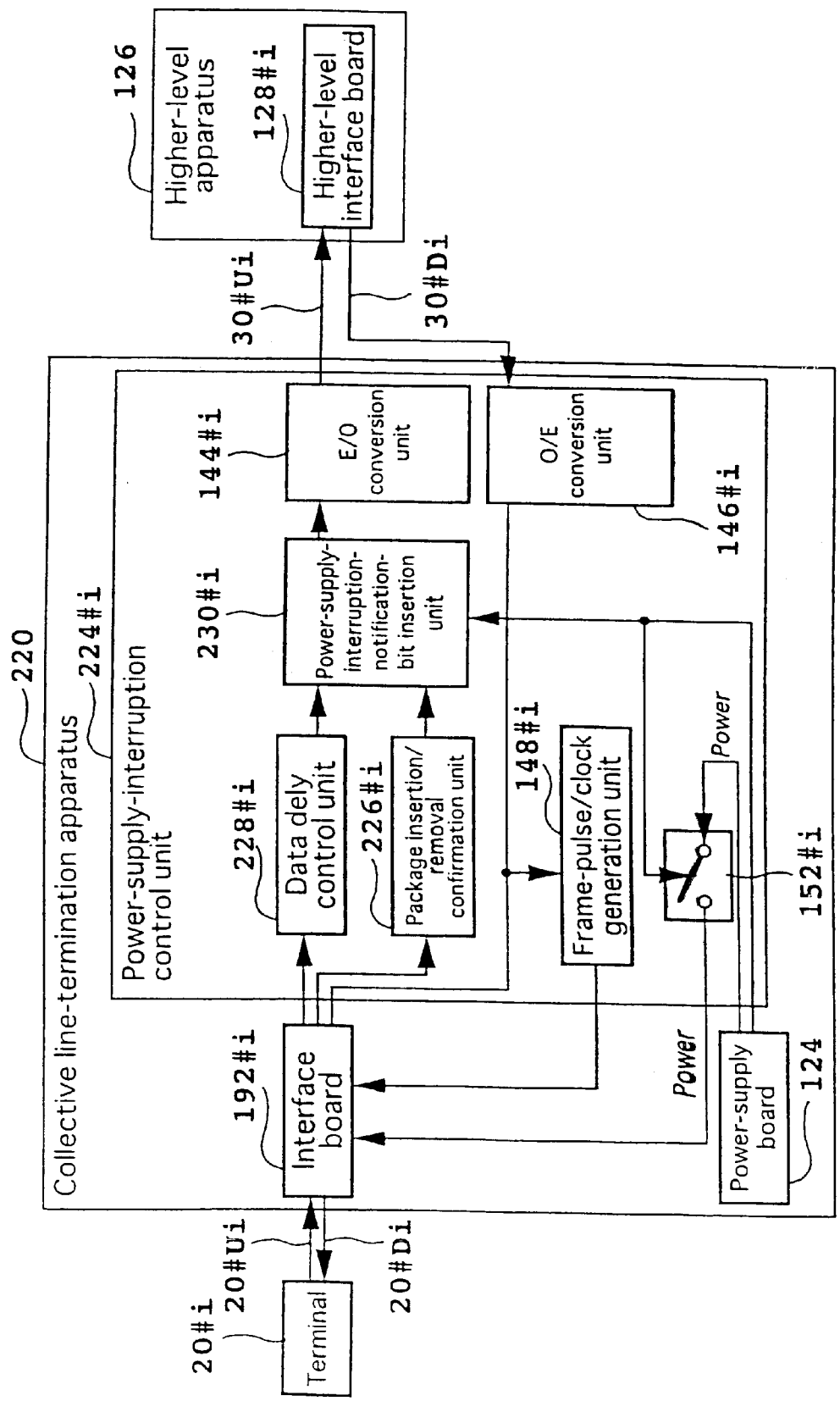
FIG. 16 is a functional block diagram showing the configuration of a power-supply-interruption control unit employed in the line-termination network shown in FIG. 15.

FIG. 16 is a functional block diagram showing the configuration of a power-supply-interruption control unit 224#i employed in the line-termination network shown in FIG. 15. As shown in FIG. 16, the power-supply-interruption control unit 224#i comprises an E/O conversion unit 144#i, an O/E conversion unit 146#i, a frame-pulse/clock generation unit 148#i, a package-insertion/removal confirmation unit 226#i, a data delay control unit 228#i, a power-supply-interruption-notification-bit insertion unit 230#i and a switch unit 152#i. When an interface board 192#i is pulled out from the collective line-termination apparatus 220 as indicated by information on insertion/removal of the interface board 192#i, the package-insertion/removal confirmation unit 226#i informs the power-supply-interruption-notification-bit insertion unit 230#i of a power-supply interruption. The data delay control unit 228#i delays a frame received from the interface board 192#i by a predetermined time equal to a period between the removal of the interface board 192#i and the arrival of a frame including information on a power-supply interruption of the interface board 192#i at the higher-level interface board 128#i. The 1-bit notice of a power-supply interruption needs to be inserted into a normal frame output by the interface board 192#i before the interface board 192#i is pulled out. In addition, the interface board 192#i is pulled out asynchronously with transmission of frames. For these two reasons, the predetermined delay time is set at a typical value equal to a multiple of the frame period. When informed of a notice of a power-supply interruption by the package-insertion/removal confirmation unit 226#i or the power-supply board 124, the power-supply-interruption-notification-bit insertion unit 230#i inserts a 1-bit notice of a power-supply interruption into a frame output by the data delay control unit 228#i in accordance with a clock signal and a frame pulse. Since the E/O conversion unit 144#i, the O/E conversion unit 146#i, the frame-pulse/clock generation unit 148#i and the switch unit 152#i are virtually identical with their counterparts employed in the collective line-termination apparatus 120 shown in FIG. 7, it is not necessary to repeat their explanation.

Next, the operation of the line-termination network shown in FIG. 15 is explained.

Case 1: With the interface board 192#i inserted into the collective line-termination apparatus 220, the package-insertion/removal confirmation unit 226#i does not indicate a power-supply interruption of the interface board 192#i. The data delay control unit 228#i delays the frame received from the interface board 192#i by a predetermined time before supplying the frame to the power-supply-interruption-notification-bit insertion unit 230#i. Since the package insertion/removal confirmation unit 226#i does not indicate a power-supply interruption of the interface board 192#i, the package-insertion/removal confirmation unit 226#i passes through the output of the data delay control unit 228#i as it is for transmission to the higher-level interface board 128#i.

Case 2: The interface board 192#1 is no longer needed and thus pulled out. When the interface board 192#1 is pulled out as evidenced by the information on insertion/removal indicating that the unit 192#1 has been removed, the package-insertion/removal confirmation unit 226#1 informs the power-supply-interruption-notification-bit insertion unit 230#1 of the power-supply interruption of the interface board 192#1. In the mean time, the data delay control unit 228#1 delays the frame received from the interface board 192#1 by a predetermined time before supplying the frame to the power-supply-interruption-notification-bit insertion unit 230#1. Informed of a notice of a power-supply interruption by the package-insertion/removal confirmation unit 226#1, the power-supply-interruption-notification-bit insertion unit 230#i inserts a 1-bit notice of a power-supply interruption into a frame output by the data delay control unit 228#1 in accordance with a clock signal and a frame pulse, outputting the frame to the transmission line 30#U1. At that time, the 1-bit notice of a power-supply interruption is inserted into a normal frame output by the interface board 192#1 before the interface board 192#1 is pulled out. The higher-level interface board 128#1 detects the power-supply-interruption notification bit, masking an alarm bit of the lower level. Since the alarm bit of the lower level is masked before the higher-level interface board 128#1 receives an abnormal frame caused by the removal of the interface board 192#1, no incorrect alarm is reported to the higher-level apparatus 126 due to the removal of the interface board 192#1.

Case 3: When the collective line-termination apparatus 220 itself is no longer used, the power-supply-interruption switch unit employed in the power-supply board 124 is turned off and the power-supply-interruption-notification-bit insertion unit 230#i is informed of a power-supply interruption. The power-supply-interruption-notification-bit insertion unit 230#i inserts a power-supply-interruption notification bit into a frame output by the data delay control unit 228#i, and outputs the frame to the transmission line 30#Ui. The higher-level interface board 128#i detects the power-supply-interruption notification bit, masking the alarm bit of the lower level.

Case 4: When power generated by an external power supply of the power-supply board 124 is cut off, the same operations as the fourth embodiment are carried out.

As described above, the fifth embodiment provides the same effects as the second embodiment.

Sixth Embodiment

Figure 17:
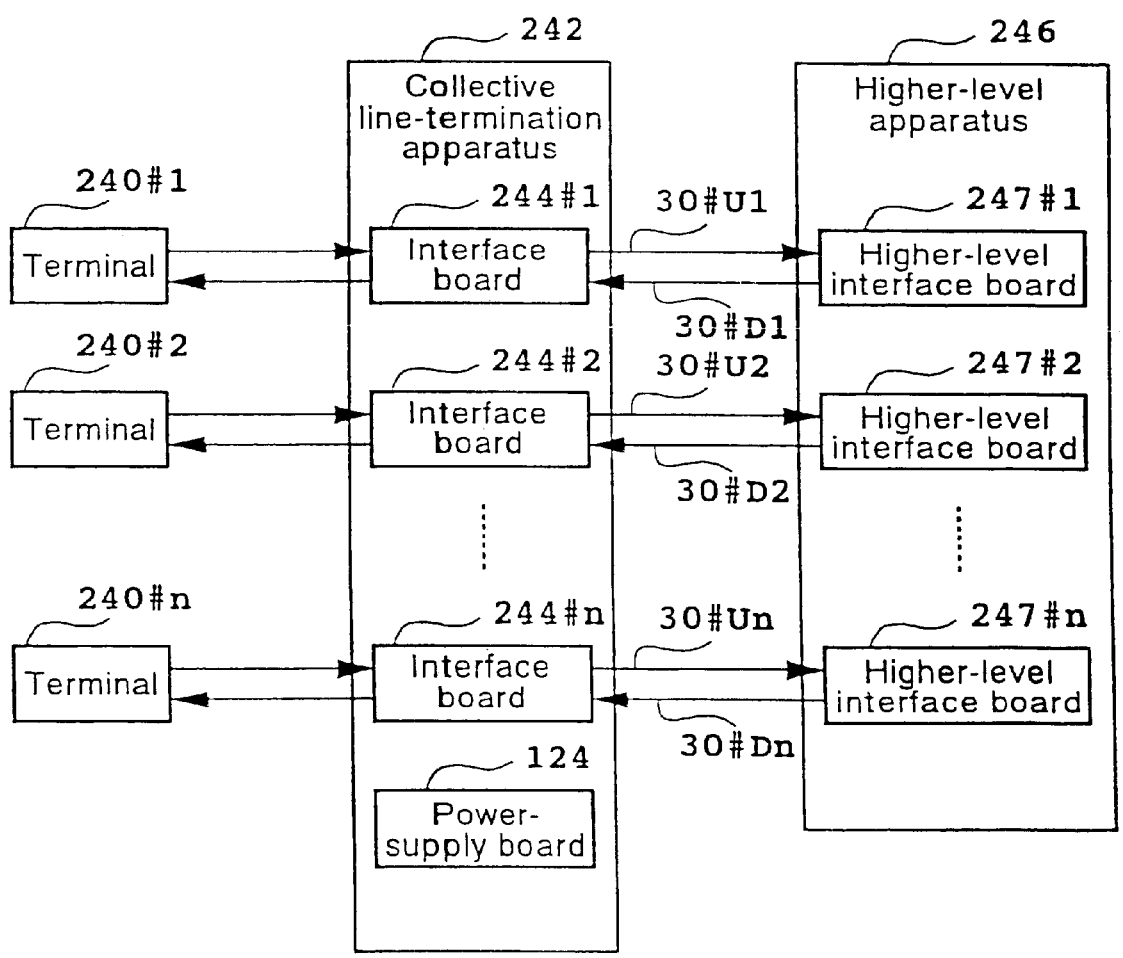
FIG. 17 is a block diagram showing the configuration of a line-termination network implemented by a sixth embodiment of the present invention.
Figure 18:
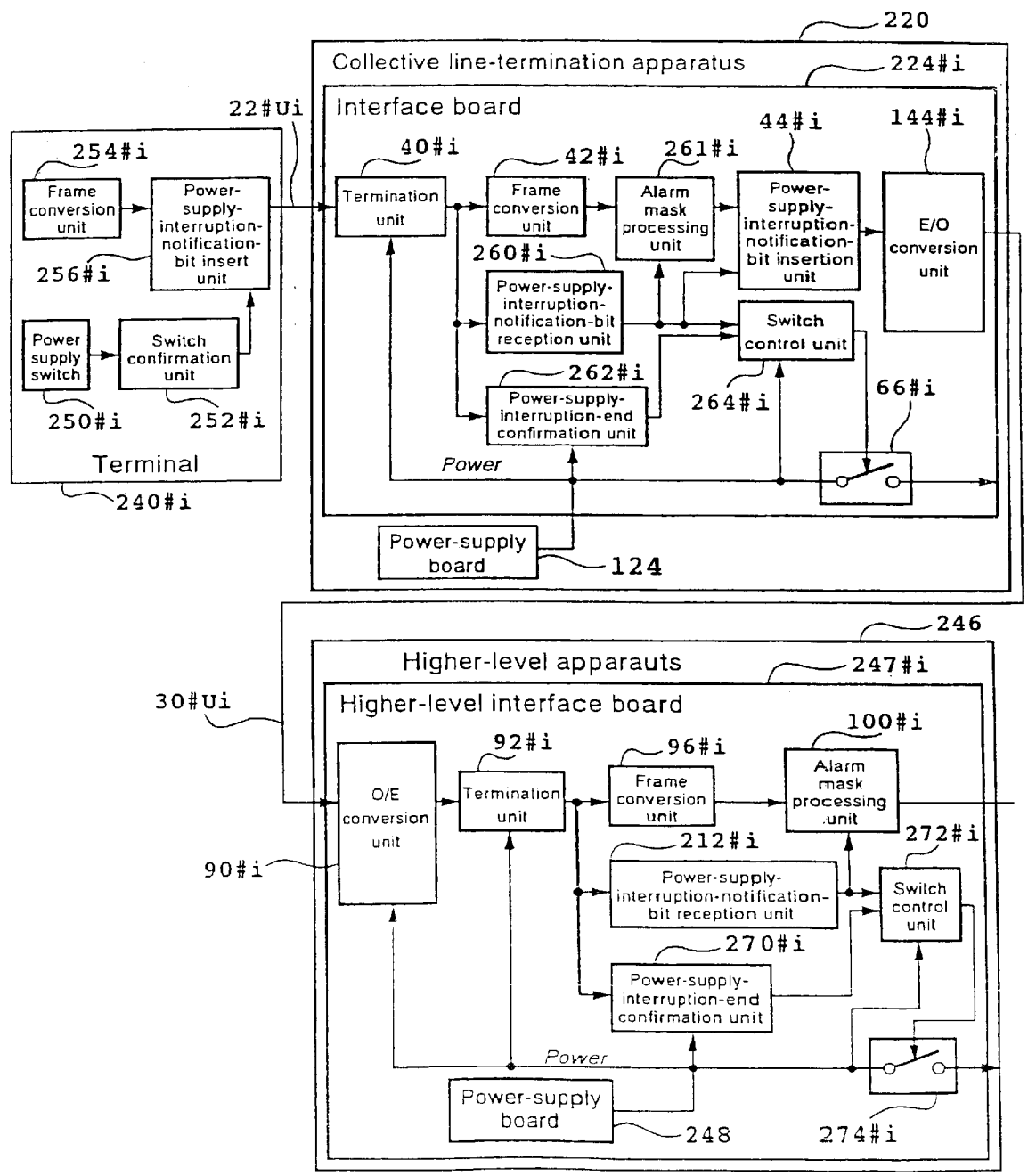
FIG. 18 is a block diagram showing the configurations of a terminal, an interface board and a higher-level interface board which are employed in the line-termination network shown in FIG. 17.

FIG. 17 is a block diagram showing the configuration of a line-termination network implemented by a sixth embodiment of the present invention and FIG. 18 is a block diagram showing the configurations of a terminal 240#i, an interface board 244#i and a higher-level interface board 247#i which are employed in the line-termination network shown in FIG. 17. It should be noted that the figures do not show a functional block related to transmission of a frame from the higher-level apparatus 246 to the terminal 240#i. As shown in FIG. 18, the terminal 240#i comprises a power-supply switch unit 250#i, a switch confirmation unit 252#i, a frame conversion unit 254#i and a power-supply-interruption-notification-bit insertion unit 256#i. The power-supply switch unit 250#i is a switch which is turned off by the user when the terminal 240#i is not used. When the power-supply switch unit 250#i is turned off, the switch confirmation unit 252#i informs the power-supply-interruption-notification-bit insertion unit 256#i of a power-supply interruption. The frame conversion unit 254#i creates a frame prescribed as a frame to be transmitted from the terminal 240#i to the interface board 244#i. The power-supply-interruption-notification-bit insertion unit 256#i inserts a 1-bit notice of a power-supply interruption into the frame.

The 1-bit notice of a power-supply interruption is inserted into a predetermined bit position in the frame. When a contemporary primary group speed user network interface frame is used, for example, an unused bit is allocated as a power-supply-interruption notification bit. When a new frame is prescribed, however, a predetermined bit is allocated as a power-supply-interruption notification bit in advance.

On the other hand, the interface board 244#i comprises a termination unit 40#i, a frame conversion unit 42#i, a power-supply-interruption-notification-bit insertion unit 44#i, an E/O conversion unit 48#i, an O/E conversion unit 50#i, a switch unit 66#i, a power-supply-interruption-notification-bit reception unit 260#i, a alarm mask processing unit 261#i, a power-supply-interruption-end confirmation unit 262#i, a power-supply-interruption-notification-information-bit insertion unit 263#i and a switch control unit 264#i. Since the termination unit 40#i, the frame conversion unit 42#i, the E/O conversion unit 48#i and the switch unit 66#i are virtually identical with their counterparts employed in the interface board 26#i shown in FIG. 3, their explanation is not repeated.

If a frame transmitted by the terminal 240#i includes the power-supply-interruption notification bit, the power-supply-interruption-notification-bit reception unit 260#i notifies the alarm mask processing unit 261#i, the power-supply-interruption-notification-bit insertion unit 44#i and the switch control unit 264#i of the power-supply interruption. The power-supply-interruption-end confirmation unit 262#i receives power supplied by the power-supply board 124. The power-supply-interruption-end confirmation unit 262#i also monitors frames coming from the transmission line 22#Ui all the time. If a normal frame including no power-supply-interruption notification bit is received from the terminal 240#i which has just resumed its operation, the power-supply-interruption-end confirmation unit 262#i requests the frame conversion unit 254#i to turn on the switch unit 66#i. When informed of a power-supply interruption by the power-supply-interruption-notification-bit reception unit 260#i, the alarm mask processing unit 261#i masks an alarm bit. When receiving a notice of a power-supply interruption for the terminal 240#i from the power-supply-interruption-notification-bit reception unit 260#i, the switch control unit 264#i turns off the switch unit 66#i after a time with a predetermined length has lapsed. The switch control unit 264#i turns on the switch unit 66#i upon a request made by the power-supply-interruption-end confirmation unit 262#i. The switch unit 66#i supplies power to all components employed in the collective line-termination apparatus 220 except the termination unit 40#i and the power-supply-interruption-end confirmation unit 262#i which require power all the time.

The higher-level interface board 247#i comprises an O/E conversion unit 90#i, a termination unit 92#i, a frame conversion unit 96#i, an alarm mask processing unit 100#i, an other-transmission-line-power-supply-interruption-notification-bit reception unit 212#i, a power-supply-interruption-end confirmation unit 270#i, a switch control unit 272#i and a switch unit 274#i. Since the O/E conversion unit 90#i, the termination unit 92#i, the frame conversion unit 96#i and the alarm mask processing unit 100#i are essentially identical with their counterparts employed in the higher-level interface board 34#i shown in FIG. 5, their explanation is not repeated. The power-supply-interruption-end confirmation unit 270#i monitors frames coming from the transmission line 30#Ui all the time. If a normal frame including no power-supply-interruption notification bit is received from the transmission line 30#Ui, the power-supply-interruption-end confirmation unit 270#i requests the switch control unit 272#i to turn on the switch unit 274#1. When receiving a notice of a power-supply interruption from the power-supply-interruption-notification-bit reception unit 212#i, the switch control unit 272#i turns off the switch unit 274#i after a time with a predetermined length has lapsed. The switch control unit 272#i turns on the switch unit 274#i upon a request made by the power-supply-interruption-end confirmation unit 270#i. The power-supply-interruption-notification-bit reception unit 212#i detects a power-supply-interruption bit included in a frame received from the terminal 240#i. If the power-supply-interruption bit is included in the frame, the power-supply-interruption-notification-bit reception unit 212#i informs the alarm mask processing unit 100#i and the switch control unit 272#i of the power-supply interruption. The switch unit 274#i is turned on and off in accordance with control executed by the switch control unit 272#i to respectively deliver or block power supplied by a power-supply board 248 to all components employed in the higher-level interface board 247#i except the O/E conversion unit 90#i, the termination unit 92#i and the power-supply-interruption-end confirmation unit 270#i. The power-supply board 248 supplies power to the higher-level interface board 247#i.

Next, the operation of the line-termination network shown in FIG. 17 is explained.

Case 1: When the terminal 240#i is not used for the time being, the user turns off the power-supply switch unit 250#i. When the user turns off the power-supply switch unit 250#i, the switch confirmation unit 252#i informs the power-supply-interruption-notification-bit insertion unit 256#i of a power-supply interruption. The frame conversion unit 254#i converts a created frame into a frame prescribed as a frame to be transmitted to the interface board 244#i. Notified of the power-supply interruption, the power-supply-interruption-notification-bit insertion unit 256#i inserts a 1-bit notice of a power-supply interruption into the frame before its transmission to the interface board 244#i through the transmission line 22#Ui. Detecting the power-supply-interruption-notification bit in the frame received from the terminal 240#i, the power-supply-interruption-notification-bit reception unit 260#i employed in the interface board 244#i notifies the alarm mask processing unit 261#i, the power-supply-interruption-bit insertion unit 44#i and the switch control unit 264#i of the power-supply interruption. Informed of the power-supply interruption, the alarm mask processing unit 261#i masks an alarm bit. Notified of the power-supply interruption, the power-supply-interruption-notification-bit insertion unit 44#i inserts a 1-bit notice of the power-supply interruption into a frame. Informed of the power-supply interruption, the switch control unit 264#i turns off the switch unit 66#i after the predetermined time passes.

By the same token, when detecting the power-supply-interruption-notification bit in the frame received from the interface board 244#i, the power-supply-interruption-notification-bit reception unit 212#i employed in the higher-level interface board 247#i notifies the alarm mask processing unit 100#i and the switch control unit 272#i of the power-supply interruption. Informed of the power-supply interruption, the alarm mask processing unit 100#i masks an alarm bit in the frame. Notified of the power-supply interruption, the switch control unit 272#i turns off the switch unit 274#i. As described above, since power supplied to the interface board 244#i and the higher-level interface board 247#i is cut off when the power-supply switch unit 250#i employed in the terminal 240#i is turned off, the power consumption can be reduced.

Case 2: In order to resume the use of the terminal 240#i, the user turns on the power-supply switch unit 250#i. When the user turns on the power-supply switch unit 250#i, the switch confirmation unit 252#i does not notify the power-supply-interruption-notification-bit insertion unit 256#i of a power-supply interruption. The frame conversion unit 254#i converts a created frame into a frame prescribed as a frame to be transmitted to the interface board 244#i. Notified of no interruption, the power-supply-interruption-notification-bit insertion unit 256#i does not insert a 1-bit notice of a power-supply interruption into the frame, passing on the frame to the transmission line 22#Ui as it is. As a result, a normal frame is received by the interface board 244#i. After verifying that the frame received from the terminal 240#i is normal, the power-supply-interruption-end confirmation unit 262#i employed in the interface board 244#i requests the switch control unit 264#i to turn on the switch unit 66#i. The switch control unit 264#i turns on the switch unit 66#i upon the request made by the power-supply-interruption-end confirmation unit 262#i. Thus, power generated by the power-supply board 124 is supplied to all components. The frame conversion unit 42#i converts a frame received by the termination unit 40#i into a proper frame. Since no 1-bit notice of a power-supply interruption is detected, the power-supply-interruption-bit insertion unit 44#i outputs a normal frame to the transmission line 30#Ui as it is by way of the E/O conversion unit 48#i without inserting a 1-bit notice of a power-supply interruption.

After verifying that the frame received from the interface board 244#i is normal, the power-supply-interruption-end confirmation unit 270#i employed in the higher-level interface board 247#i requests the switch control unit 272#i to turn on the switch unit 274#i. The switch control unit 272#i turns on the switch unit 274#i upon the request made by the power-supply-interruption-end confirmation unit 270#i. Thus, power generated by the power-supply board 248 is supplied to all components. The frame conversion unit 96#i converts a frame received by the termination unit 92#i into a proper frame. Since no 1-bit notice of a power-supply interruption is detected, the alarm mask processing unit 100#i outputs a normal frame to the transmission line 36#Ui as it is by way of the E/O conversion unit 102#i without masking an alarm bit. In this way, the exchange of data between the terminal 240#i and the higher-level interface board 247#i is resumed.

According to the sixth embodiment described above, when the power-supply switch of a terminal is turned off, the operations of an interface board and an interface board at a higher level are halted. As a result, the power consumption can be expected to decrease.

As described above, according to the embodiments of the present invention, a notice confirming a power-supply interruption is received from a higher-level apparatus. Thus, it is possible to confirm that a notice of a power-supply interruption has been received normally by the apparatus at the higher level. In addition, according to the present invention, since the amount of power to be supplied by a backup circuit in the event of a power-supply interruption can be made small, the size of the backup circuit can be reduced. Furthermore, when a transmission line is not used, power supplied to interface circuits is cut off. As a result, the power consumption can be reduced.

The present invention is not limited to the details of the preferred embodiments described above. Instead, the scope of the present invention is defined by the appended claims, and all changes as well as modifications falling within the equivalence of the scope of the claims are therefore to be embraced by the invention.

What is claimed is:

1. A collective line-termination apparatus having a power-supply board and a plurality of interface boards each serving as an interface between a terminal connected to said interface board and a higher-level apparatus, said collective line-termination apparatus comprising:

power-supply-interruption-notification requesting means provided in each of said interface boards and used for outputting a request signal making a request for notification of a power-supply interruption;

a first switch provided in each of said interface boards and used for passing on or cutting off power generated by said power-supply board;

power-supply-interruption-notification-information insertion means provided in each of said interface boards and used for inserting power-supply-interruption-notification information into a first predetermined bit position in a first frame to be transmitted to said higher-level apparatus;

power-supply-interruption-confirmation-information reception means provided in each of said interface boards and used for receiving power-supply-interruption-confirmation information inserted into a second predetermined bit position in a second frame to be transmitted by said higher-level apparatus; and alarm generation means provided in each of said interface boards and used for generating an alarm signaling the fact that said associated power-supply-interruption-confirmation-information reception means does not receive said power-supply-interruption-confirmation information even after a period of time with a predetermined length lapses since an issuance of said request signal by said associated power-supply-interruption-notification requesting means to make a request for notification of a power-supply interruption, wherein said first switch is turned off to cut off power generated by said power-supply board when said power-supply-interruption-confirmation-information reception means receives said power-supply-interruption-confirmation information.

2. A collective line-termination apparatus according to claim 1, said apparatus further comprising:

a second switch provided on said power-supply board;

a third switch provided on said power supply board and used for passing on or cutting off power;

power-supply-interruption notification means provided on said power-supply board and used for outputting power-supply-interruption information to each of said interface boards when said second switch is turned off; and power-supply-interruption-confirmation means provided on each of said interface boards and used for:

requesting said power-supply-interruption-notification-information insertion means to insert power-supply-interruption notification information based on said power-supply-interruption information; and informing said power-supply board of the fact that power-supply-interruption-confirmation information is received by said power-supply-interruption-confirmation-information reception means when said power-supply-interruption-confirmation-information reception means receives said power-supply-interruption-confirmation information after said power-supply-interruption-notification-information insertion means is requested to insert power-supply-interruption notification information, wherein said second switch is turned off when the fact that said power-supply-interruption-confirmation-information is received is notified by said power-supply-interruption confirmation means provided on each of said interface boards.

3. A collective line-termination apparatus having a power-supply board and a plurality of interface boards each serving as an interface between a terminal connected to said interface board and a higher-level apparatus, said collective line-termination apparatus comprising:

insertion/removal notification unit provided in each of said interface boards, connected to one of said terminals connected to said interface board and used for outputting information on insertion/removal indicating either an insertion or a removal;

first switch provided in each of said interface boards and used for passing on or cutting off power generated by said power-supply board;

power-supply-interruption notification means provided in each of said interface boards and used for transmitting a first frame including inserted power-supply-interruption information to said higher-level apparatus; and insertion/removal confirmation means provided in each of said interface boards and used for requesting said power-supply-interruption notification means to transmit said first frame to said higher-level apparatus when said insertion/removal notification unit outputs information on insertion/removal indicating a removal, wherein said first switch is controlled to turn on and off in accordance with said information on insertion/removal.

4. A collective line-termination apparatus according to claim 3 wherein:

each of said insertion/removal notification units comprises:

a first termination unit for terminating a second frame received from said terminal;

a first frame conversion unit for converting said second frame into a third frame on the basis of a clock signal and a frame pulse indicating the head of said second frame; and an insertion/removal information output unit for outputting said information on insertion/removal, and each of said power-supply-interruption notification means comprises:

frame-pulse/clock generation means for generating said frame pulse and said clock signal;

power-supply-interruption-notification-frame creation means for creating a fourth frame, which is synchronized with said third frame and includes said power-supply-interruption-notification information, on the basis of said clock signal and said frame pulse; and a selector for selecting either said third frame or said fourth frame in accordance with a command issued by said insertion/removal confirmation means.

5. A collective line-termination apparatus having a power-supply-interruption central control board and a plurality of interface boards each serving as an interface between a terminal connected to said interface board and a higher-level interface board accommodated in a higher-level apparatus, said collective line-termination apparatus comprising:

an insertion/removal information output unit provided on each of said interface boards and used for outputting information on insertion/removal indicating either an insertion or a removal;

power-supply-interruption-notification multiplexing means provided on said power-supply-interruption central control board and used for multiplexing pieces of power-supply-interruption notification information for said interface boards in a first frame;

insertion/removal confirmation means provided on said power-supply-interruption central control board for each of said interface boards and used for requesting said power-supply-interruption-notification multiplexing means to multiplex pieces of power-supply-interruption notification information for any specific ones of said interface boards removed from said collective line-termination apparatus as indicated by said information on insertion/removal output by said insertion/removal information output units provided on said specific interface boards;

transmission means provided on said power-supply-interruption central control board and used for transmitting said first frame to said higher-level apparatus; and data delay control means provided on said power-supply-interruption central control board for each of said interface boards and used for delaying a second frame output by said interface board by a time not shorter than a period between a point of time for a removal of said interface board and a point of time for an arrival of a notification of a power-supply interruption for said interface board at said higher-level interface board.

6. A line-termination network comprising a higher-level apparatus and a collective line-termination apparatus wherein:

said higher-level apparatus comprises a power-supply-interruption control interface board and a plurality of higher-level interface boards; and said collective line-termination apparatus comprises a power-supply-interruption central control board and a plurality of interface boards each serving as an interface between a terminal connected to said interface board and one of said higher-level interface boards, said line-termination network comprising:

power-supply-interruption-notification multiplexing means provided on said power-supply-interruption central control board and used for multiplexing pieces of power-supply-interruption notification information for said interface boards in a first frame;

insertion/removal confirmation means provided on said power-supply-interruption central control board for each of said interface boards and used for requesting said power-supply-interruption-notification multiplexing means to multiplex pieces of power-supply-interruption notification information for any specific ones of said interface boards removed from said collective line-termination apparatus as indicated by said information on insertion/removal output by insertion/removal information output units provided on said specific interface boards;

transmission means provided on said power-supply-interruption central control board and used for transmitting said first frame to said power-supply-interruption control interface board;

data delay control means provided on said power-supply-interruption central control board for each of said interface boards and used for delaying a second frame output by said interface board by a time not shorter than a period between a point of time for a removal of said interface board and a point of time for an arrival of a notification of a power-supply interruption for said interface board at said higher-level interface board;

first power-supply-interruption-information reception means provided on said power-supply-interruption control interface board and used for receiving said pieces of power-supply-interruption notification information for said interface boards multiplexed in said second frame;

power-supply-interruption-information transmission means provided on said power-supply-interruption control interface board and used for transmitting said pieces of power-supply-interruption notification information received by said first power-supply-interruption-information reception means to said higher-level interface boards supposed to receive said pieces of power-supply-interruption notification information; and second power-supply-interruption-information reception means provided on each of said higher-level interface boards and used for receiving one of said pieces of power-supply-interruption notification information from said power-supply-interruption-information transmission means.

7. A collective line-termination apparatus having a power-supply-interruption central control board and a plurality of interface boards each serving as an interface between a terminal connected to said interface board and a higher-level interface board accommodated in a higher-level apparatus, said collective line-termination apparatus comprising:

an insertion/removal information output unit provided on each of said interface boards and used for outputting information on insertion/removal indicating either an insertion or a removal;

power-supply-interruption-notification-information insertion means provided on said power-supply-interruption central control board and used for inserting power-supply-interruption notification information for a specific one of said interface boards into a first frame output by each of other ones of said interface boards not removed from said collective line-termination apparatus as indicated by said information on insertion/removal output by said specific interface board;

insertion/removal confirmation means provided on said power-supply-interruption central control board for each of said interface boards and used for requesting said power-supply-interruption-notification-information insertion means to insert power-supply-interruption notification information for said interface board removed from said collective line-termination apparatus as indicated by said information on insertion/removal output by said interface board; and data delay control means provided on said power-supply-interruption central control board for each of said interface boards and used for delaying a second frame output by said interface board by a time not shorter than a period between a point of time for a removal of said interface board and a point of time for an arrival of a notification of a power-supply interruption for said interface board at said higher-level interface board.

8. A line-termination network having a higher-level apparatus and a collective line-termination apparatus wherein:

said higher-level apparatus includes a plurality of higher-level interface boards; and said collective line-termination apparatus comprises a power-supply-interruption central control board and a plurality of interface boards each serving as an interface between a terminal connected to said interface board and one of said higher-level interface boards, said line-termination network comprising:

an insertion/removal information output unit provided on each of said interface boards and used for outputting information on insertion/removal indicating either an insertion or a removal;

power-supply-interrupt ion-notification-information insertion means provided on said power-supply-interruption central control board and used for inserting power-supply-interruption notification information for a specific one of said interface boards into a first frame output by each of other ones of said interface boards not removed from said collective line-termination apparatus as indicated by said information on insertion/removal output by said specific interface board;

insertion/removal confirmation means provided on said power-supply-interruption central control board for each of said interface boards and used for requesting said power-supply-interruption-notification-information insertion means to insert power-supply-interruption notification information for said interface board removed from said collective line-termination apparatus as indicated by said information on insertion/removal output by said specific interface board;

data delay control means provided on said power-supply-interruption central control board for each of said interface boards and used for delaying a second frame output by said interface board by a time not shorter than a period between a point of time for a removal of said interface board and a point of time for an arrival of a notification of a power-supply interruption for said interface board at said higher-level interface board;

first power-supply-interruption-information reception means provided on said higher-level interface board and used for receiving said pieces of power-supply-interruption information of other interface boards included in said first frame;

power-supply-interruption-information transmission means provided on said higher-level interface board and used for transmitting said power-supply-interruption information of said other interface boards to corresponding interface boards; and second power-supply-interruption-information reception means provided on each of said higher-level interface boards and used for receiving said power-supply-interruption information from said power-supply-interruption-information transmission means.

9. A collective line-termination apparatus having a power-supply-interruption central control board and a plurality of interface boards each serving as an interface between a terminal connected to said interface board and a higher-level interface board accommodated in a higher-level apparatus, said collective line-termination apparatus comprising:

an insertion/removal information output unit provided on each of said interface boards and used for outputting information on insertion/removal indicating either an insertion or a removal;

insertion/removal confirmation means provided on said power-supply-interruption central control board for each of said interface boards and used for generating a notification of a power-supply interruption for a specific one of said interface boards removed from said collective line-termination apparatus as indicated by said information on insertion/removal output by said specific interface board;

data delay control means provided on said power-supply-interruption central control board for each of said interface boards and used for delaying a frame output by said interface board by a time not shorter than a period between a point of time for a removal of said interface board and a point of time for an arrival of a notification of a power-supply interruption for said interface board at said higher-level interface board; and power-supply-interruption-notification-information insertion means provided on said power-supply-interruption central control board for each of said interface boards and used for inserting power-supply-interruption notification information into a predetermined bit of a frame output by said data delay control means in accordance with a notification of a power-supply interruption output by said insertion/removal confirmation means.

10. A line-termination network having a terminal, a higher-level apparatus having a first power-supply board and a line-termination apparatus provided with a second power-supply board and used as an interface between said terminal and said higher-level apparatus, said network comprising:

a first switch provided on said terminal;

a second switch provided on said line-termination apparatus and used for passing on and cutting off power supplied by said second power-supply board;

first power-supply-interruption-notification-information insertion means provided on said terminal and used for inserting first power-supply-interruption-notification information into a first predetermined bit of a first frame which is transmitted to said line-termination apparatus when said first switch is turned off;

first power-supply-interruption-notification-information reception means provided on said line-termination apparatus and used for receiving said first power-supply-interruption-notification information inserted into said first frame;

second power-supply-interruption-notification-information insertion means provided on said line-termination apparatus and used for inserting second power-supply-interruption-notification information into a second predetermined bit of a second frame which is transmitted to said higher-level apparatus when said first power-supply-interruption-notification-information reception means receives said first power-supply-interruption-notification information;

first power-supply-interruption control means provided on said line-termination apparatus and used for cutting off supplied power by turning off said second switch upon reception of said first power-supply-interruption-notification information by said first power-supply-interruption-notification-information reception means; and first power-supply-interruption-end confirmation means provided on said line-termination apparatus and used for passing on supplied power by turning on said second switch upon reception of a normal first frame not including said first power-supply-interruption-notification information.

11. A line-termination network according to claim 10 further comprising:

a third switch provided on said higher-level apparatus and used for passing on and cutting off power supplied by said first power-supply board;

second power-supply-interruption-notification-information reception means provided on said higher-level apparatus and used for receiving said second power-supply-interruption-notification information inserted into said second frame;

second power-supply-interruption control means provided on said higher-level apparatus and used for cutting off supplied power by turning off said third switch upon reception of said second power-supply-interruption-notification information by said second power-supply-interruption-notification-information reception means; and a second power-supply-interruption-end confirmation means provided on said higher-level apparatus and used for passing on supplied power by turning on said third switch upon reception of a normal second frame not including said second power-supply-interruption-notification information.

* * * * *